(12) United States Patent
Weindorf

(10) Patent No.: US 11,808,957 B2
(45) Date of Patent: *Nov. 7, 2023

(54) SYSTEM AND METHOD FOR ADJUSTING LIGHT INTENSITY IN A DISPLAY SYSTEM

(71) Applicant: VISTEON GLOBAL TECHNOLOGIES, INC., Van Buren Township, MI (US)

(72) Inventor: Paul Fredrick Luther Weindorf, Novi, MI (US)

(73) Assignee: Visteon Global Technologies, Inc., Van Buren Township, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/433,507

(22) PCT Filed: Feb. 25, 2020

(86) PCT No.: PCT/US2020/019635
§ 371 (c)(1),
(2) Date: Aug. 24, 2021

(87) PCT Pub. No.: WO2020/176465
PCT Pub. Date: Sep. 3, 2020

(65) Prior Publication Data
US 2022/0268974 A1 Aug. 25, 2022

Related U.S. Application Data

(63) Continuation-in-part of application No. 16/284,627, filed on Feb. 25, 2019, now Pat. No. 11,256,135.
(Continued)

(51) Int. Cl.
*G02B 5/02* (2006.01)
*G02F 1/1335* (2006.01)
*G02B 1/118* (2015.01)

(52) U.S. Cl.
CPC ............ *G02B 5/0242* (2013.01); *G02B 1/118* (2013.01); *G02B 5/0278* (2013.01); *G02F 1/133528* (2013.01)

(58) Field of Classification Search
CPC ............... G02F 1/1347; G02F 1/13471; G02F 1/133308; G02F 2001/133314
See application file for complete search history.

(56) References Cited

U.S. PATENT DOCUMENTS 5,299,039 A * 3/1994 Bohannon ............ H04N 9/3126
348/E9.037
5,548,422 A 8/1996 Conner et al.
(Continued)

FOREIGN PATENT DOCUMENTS

CN 102749752 A 10/2012
EP 1024393 A1 8/2000
(Continued)

OTHER PUBLICATIONS

Panasonic Develops Industry's First IPS Liquid Crystal Panel with Contrast Ratio of over 1,000,000:1, Panasonic Corporation Press Release, Nov. 28, 2016, pp. 1-5, Panasonic Corporation.
(Continued)

*Primary Examiner* — Jessica M Merlin
(74) *Attorney, Agent, or Firm* — Quinn IP Law

(57) ABSTRACT

A display system including a backlight including a housing receiving light emitting elements to generate and project light from the backlight and reflective portions disposed on the housing is described. A first display unit is disposed proximate the backlight and may include an upper substrate, a liquid crystal layer, and a lower substrate disposed opposite the upper substrate. A reflective polarizer may cooperate with one or more of the upper substrate and the lower substrate of the first display unit. A second display unit is disposed proximate the first display unit. The second display
(Continued)

unit may include an upper substrate, a thin-film transistor (TFT) display layer cooperating with the upper substrate and a lower substrate disposed opposite the upper substrate that cooperates with the TFT display layer. A linear polarizer may cooperate with one or more of the upper substrate and the lower substrate of the second display unit.

20 Claims, 12 Drawing Sheets

Related U.S. Application Data

(60) Provisional application No. 62/843,810, filed on May 6, 2019.

(56) References Cited

U.S. PATENT DOCUMENTS

| | | | |
|---|---|---|---|
| 5,686,979 | A | 11/1997 | Weber et al. |
| 5,818,522 | A | 10/1998 | Sato |
| 6,822,711 | B1 | 11/2004 | Yoshida et al. |
| 7,106,396 | B2 | 9/2006 | Suzuki |
| 7,268,841 | B2 | 9/2007 | Kasajima et al. |
| 7,495,719 | B2 | 2/2009 | Adachi et al. |
| 7,916,223 | B2 | 3/2011 | Kitagawa et al. |
| 8,045,098 | B2 | 10/2011 | Kitagawa et al. |
| 8,248,555 | B2 | 8/2012 | Senoue et al. |
| 8,482,698 | B2 | 7/2013 | Atkins |
| 8,672,493 | B2 | 3/2014 | Tsuda et al. |
| 8,891,042 | B1 | 11/2014 | Osterman et al. |
| 9,329,430 | B2 | 5/2016 | Erinjippurath et al. |
| 9,535,280 | B2 | 1/2017 | Borrelli et al. |
| 9,684,204 | B2 | 6/2017 | Sakai et al. |
| 9,772,530 | B2 | 9/2017 | Gilbert |
| 9,860,516 | B2 | 1/2018 | Muneki et al. |
| 9,864,243 | B2 | 1/2018 | Erinjippurath et al. |
| 9,960,389 | B1* | 5/2018 | Hao ..................... C08G 18/73 |
| 10,056,022 | B2 | 8/2018 | Bonnier et al. |
| 10,191,337 | B2 | 1/2019 | Ono |
| 10,310,346 | B2 | 6/2019 | Kim et al. |
| 11,256,135 | B2* | 2/2022 | Weindorf ............ G02F 1/13471 |
| 2001/0008464 | A1* | 7/2001 | Ouderkirk ......... G02F 1/133536 |
| | | | 359/489.15 |
| 2003/0081402 | A1 | 5/2003 | Jeon et al. |
| 2004/0125430 | A1 | 7/2004 | Kasajima et al. |
| 2004/0218118 | A1 | 11/2004 | Hayashi |
| 2005/0088401 | A1 | 4/2005 | Daly |
| 2005/0140258 | A1* | 6/2005 | Leu .......................... G02B 5/18 |
| | | | 313/113 |
| 2006/0191177 | A1 | 8/2006 | Engel |
| 2008/0007486 | A1 | 1/2008 | Fujinawa et al. |
| 2008/0225512 | A1 | 9/2008 | Roberts et al. |
| 2009/0147186 | A1 | 6/2009 | Nakai et al. |
| 2009/0189543 | A1 | 7/2009 | Yeo et al. |
| 2009/0243504 | A1 | 10/2009 | Cho et al. |
| 2009/0284518 | A1 | 11/2009 | Sawabe |
| 2009/0295707 | A1 | 12/2009 | Furukawa et al. |
| 2009/0303419 | A1 | 12/2009 | Koma |
| 2010/0188605 | A1 | 7/2010 | Hasegawa et al. |
| 2011/0141152 | A1 | 6/2011 | Park et al. |
| 2011/0141154 | A1 | 6/2011 | Ahn et al. |
| 2011/0141405 | A1 | 6/2011 | Kitagawa et al. |
| 2011/0164207 | A1* | 7/2011 | Arai ...................... G02F 1/1347 |
| | | | 349/96 |
| 2012/0008213 | A1* | 1/2012 | Tsuda ..................... G02B 1/118 |
| | | | 359/601 |
| 2012/0274878 | A1 | 11/2012 | Kunz et al. |
| 2013/0076704 | A1* | 3/2013 | Song .................... G02F 1/1347 |
| | | | 359/462 |
| 2013/0141668 | A1 | 6/2013 | Washio et al. |
| 2013/0335682 | A1 | 12/2013 | Gilbert et al. |
| 2014/0049734 | A1 | 2/2014 | Erinjippurath et al. |
| 2014/0293188 | A1 | 10/2014 | Casebolt et al. |
| 2015/0198834 | A1 | 7/2015 | Wu et al. |
| 2016/0004137 | A1 | 1/2016 | Sagardoyburu |
| 2016/0119613 | A1 | 4/2016 | Smith |
| 2016/0170702 | A1 | 6/2016 | Jiang et al. |
| 2016/0216540 | A1 | 7/2016 | Cho et al. |
| 2016/0372058 | A1 | 12/2016 | Wang et al. |
| 2017/0031206 | A1 | 2/2017 | Broughton et al. |
| 2017/0184870 | A1 | 6/2017 | Li et al. |
| 2017/0329160 | A1* | 11/2017 | Konuma ............. G02B 5/0215 |
| 2018/0011365 | A1 | 1/2018 | Shields et al. |
| 2018/0031897 | A1 | 2/2018 | Takao et al. |
| 2018/0047345 | A1 | 2/2018 | Dunn et al. |
| 2018/0059465 | A1 | 3/2018 | Koudo et al. |
| 2018/0120634 | A1 | 5/2018 | Chen |
| 2018/0120639 | A1 | 5/2018 | Shih et al. |
| 2018/0275445 | A1 | 9/2018 | Katagiri et al. |
| 2018/0292713 | A1 | 10/2018 | Drolet et al. |
| 2019/0129213 | A1 | 5/2019 | Cho et al. |
| 2019/0171045 | A1 | 6/2019 | Masuda |
| 2019/0270411 | A1* | 9/2019 | Dozeman .................. B60R 1/12 |
| 2019/0355321 | A1 | 11/2019 | Suzuki |
| 2020/0264469 | A1 | 8/2020 | Nakanishi et al. |

FOREIGN PATENT DOCUMENTS

| | | | |
|---|---|---|---|
| JP | 2010134269 A | 6/2010 | |
| JP | 2018200374 A | 12/2018 | |
| KR | 20140090989 A | 7/2014 | |
| WO | 9904315 A1 | 1/1999 | |
| WO | 2009107536 A1 | 9/2009 | |
| WO | WO-2009107536 A1 * | 9/2009 | ............ G02B 1/105 |
| WO | 2011162133 A1 | 12/2011 | |

OTHER PUBLICATIONS

Panasonic Develops Industry's First IPS Liquid Crystal Panel with Contrast Ration of over 1,000,000:1, Panasonic Corporation Press Release, Nov. 28, 2016, pp. 1-5, Panasonic Corporation.

\* cited by examiner

SYSTEM AND METHOD FOR ADJUSTING LIGHT INTENSITY IN A DISPLAY SYSTEM

CROSS-REFERENCE TO RELATED APPLICATIONS

This application is a Continuation-In-Part of U.S. Ser. No. 16/284,627 filed on Feb. 25, 2019, and claims the benefit of U.S. Provisional Patent Application No. 62/843,810 filed on May 6, 2019, each of which is hereby incorporated by reference in their entirety.

TECHNICAL FIELD

The present disclosure generally relates to systems and methods for adjusting light intensity in a display system, and more particularly to systems and methods for improving the optical efficiency of the display system.

BACKGROUND

Electronic displays are provided in many contexts to electronically render digital information to a viewer. The electronic displays receive information and render the information through lighted cells in patterns that reflect the texts and pictures employed to convey the information.

An exemplary prior art electronic display is illustrated in FIG. 1. The electronic display 1 is employed to provide electronic content to a viewer of the electronic display. The display 1 includes a bezel 2 defining a border of the display screen. Defining the portion within the bezel 2 is a display portion. The display portion includes a backlit display 3 cooperating with a plurality of LEDs (not shown) and a display linear polarizer 4.

The display 1 is provided with a first layer 5. This first layer 5 is a neutral density filter that reduces or modifies the intensity of all wavelengths or colors of light equally. The filter transmission may range from colorless (clear) to grey (opaque) with a constant transmission rate. An anti-reflective film 6 is disposed on the first layer 5 and may cancel light reflections to minimize a viewer from seeing visibility variations from the electronic display 1 due to the lighting environment in which the electronic display 1 is exposed.

Exemplary prior art electronic displays may control dimming and adjust visual properties of the display by creating and controlling zones of LEDs to adjust backlighting. However, calibrating and controlling the LED zones can be complex and fail to provide the contrast level adjustments sought in the display.

SUMMARY

Systems and methods are disclosed herein for enhancing the visibility of light-based information rendered on a display system utilizing a local dimming technique. This includes a display system including a backlight including a housing receiving one or more light emitting elements to generate and project light from the backlight and one or more reflective portions disposed on the housing.

A first display unit is disposed proximate to the backlight, wherein the first display unit includes an upper substrate, a liquid crystal layer cooperating with the upper substrate, a lower substrate disposed opposite the upper substrate and cooperating with the liquid crystal layer and at least one reflective polarizer cooperating with one or more of the upper substrate and the lower substrate of the first display unit.

A second display unit disposed proximate to the first display unit, wherein the second display unit includes an upper substrate, a thin film transistor (TFT) display layer cooperating with the upper substrate, a lower substrate disposed opposite the upper substrate and cooperating with the TFT display layer and at least one linear polarizer cooperating with one or more of the upper substrate and the lower substrate of the second display unit.

A diffuser is disposed between the first display unit and the second display unit. A microcontroller controls the backlight, the first display unit, and the second display unit, wherein the microcontroller is configured to execute instructions to adjust the liquid crystal layer of the first display unit between at least a first transmissive state and a second transmissive state.

An aspect of the disclosure includes the diffuser being arranged to provide a light profile transition for the light transmitted through the first display unit.

Another aspect of the disclosure includes the diffuser being disposed between the first display unit and the second display unit and including a base plastic film including a light scattering agent.

Another aspect of the disclosure includes the diffuser being disposed between the first display unit and the second display unit and including an optically clear adhesive infused with diffusion beads.

Another aspect of the disclosure includes the diffuser being disposed between the first display unit and the second display unit and including a liquid optically clear adhesive infused with diffusion beads.

Another aspect of the disclosure includes the diffuser being disposed between the first display unit and the second display unit and including an anti-sparkle film based on diffraction grating structures.

Another aspect of the disclosure includes the diffuser being disposed between the first display unit and the second display unit and including an anti-glare polarizer film including an index mismatched liquid optically clear adhesive.

Another aspect of the disclosure includes the diffuser being disposed between the first display unit and the second display unit and including a surface diffuser film including an index mismatched liquid optically clear adhesive.

Another aspect of the disclosure includes a display system including a backlight including a housing receiving one or more light emitting elements to generate and project light from the backlight and one or more reflective portions disposed on the housing. A first display unit is disposed proximate to the backlight, wherein the first display unit includes an upper substrate, a liquid crystal layer cooperating with the upper substrate, a lower substrate disposed opposite the upper substrate and cooperating with the liquid crystal layer and at least one reflective polarizer cooperating with one or more of the upper substrate and the lower substrate of the first display unit. A second display unit is disposed proximate to the first display unit, wherein the second display unit includes an upper substrate, a thin film transistor (TFT) display layer cooperating with the upper substrate, a lower substrate disposed opposite the upper substrate and cooperating with the TFT display layer and at least one linear polarizer cooperating with one or more of the upper substrate and the lower substrate of the second display unit. A diffuser is disposed between the first display unit and the second display unit. A microcontroller controls the backlight, the first display unit, and the second display unit. The microcontroller is configured to execute instructions to adjust the liquid crystal layer of the first display unit between at least a first transmissive state and a second transmissive state. The at least one reflective polarizer of the first display unit includes a first reflective polarizer having a body including an upper surface and an opposing lower surface that cooperates with the upper substrate of the first display unit, a second reflective polarizer having a body including an upper surface cooperating with the lower substrate of the first display unit and an opposing lower surface, and an anti-reflection film disposed on a rear surface of the second reflective polarizer.

Another aspect of the disclosure includes the anti-reflection film being a moth-eye-type antireflection film.

Another aspect of the disclosure includes a display system including a backlight including a housing receiving a light emitting element to generate and project light from the backlight and a reflective portion disposed on the housing. A first display unit is disposed proximate to the backlight, wherein the first display unit includes an upper substrate, a liquid crystal layer cooperating with the upper substrate, a lower substrate disposed opposite the upper substrate, and a reflective polarizer cooperating with the upper substrate and the lower substrate of the first display unit. A second display unit is disposed proximate to the first display unit, wherein the second display unit includes an upper substrate, a thin film transistor (TFT) display layer cooperating with the upper substrate, a lower substrate disposed opposite the upper substrate, and a linear polarizer. A diffuser is disposed between the first display unit and the second display unit. A microcontroller controls the backlight, the first display unit, and the second display unit. The microcontroller is configured to execute instructions to adjust the liquid crystal layer of the first display unit between a first transmissive state and a second transmissive state.

The above features and advantages and other features and advantages of the present teachings are readily apparent from the following detailed description for carrying out the teachings when taken in connection with the accompanying drawings.

BRIEF DESCRIPTION OF THE DRAWINGS

One or more embodiments will now be described, by way of example, with reference to the accompanying drawings, in which.

Figure 1:
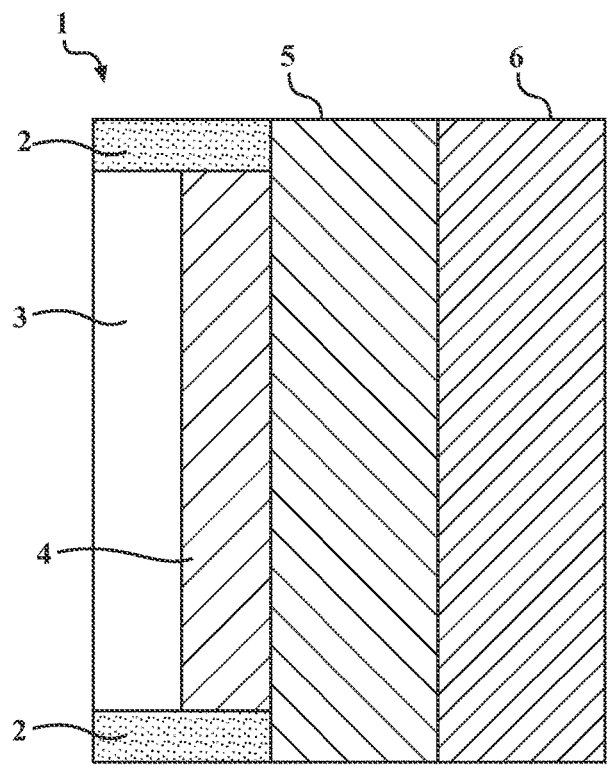
FIG. 1 is a side view of an exemplary prior art implementation of an electronic display.

The drawings are not necessarily to scale, and may present a somewhat simplified representation of various preferred features of the present disclosure as disclosed herein, including, for example, specific dimensions, orientations, locations, and shapes. Details associated with such features will be determined in part by the particular intended application and use environment.

The present disclosure may have various modifications and alternative forms, and some representative embodiments are shown by way of example in the drawings and will be described in detail herein. Novel aspects of this disclosure are not limited to the particular forms illustrated in the above-enumerated drawings. Rather, the disclosure is to cover modifications, equivalents, and combinations falling within the scope of the disclosure as encompassed by the claims.

DETAILED DESCRIPTION

Those having ordinary skill in the art will recognize that terms such as "above," "below," "front", "back", "upward," "downward," "top," "bottom," etc., may be used descriptively herein without representing limitations on the scope of the disclosure, as defined by the claims. Furthermore, the present teachings may be described in terms of functional and/or logical block components and/or various processing steps. Such block components may be comprised of various hardware, software, and/or firmware components configured to perform the specified functions.

Referring to the Figures, wherein like numerals indicate like parts throughout the several views, a display system 10 is generally described. The display system 10 is not shown or described as part of a specific application. However, it should be appreciated that the display system 10, or embodiments thereof, may be utilized in many different applications, such as but not limited to a vehicular application, an entertainment application, and an advertising display application.

Exemplary vehicular applications include but are not limited to automobiles, airplanes, trains, boats, motorcycles, all-terrain vehicles (ATV), utility task vehicles (UTV), etc. For example, the display system 10 may be incorporated into an instrument cluster, a center console display, a passenger entertainment display, etc. Exemplary entertainment applications include, but are not limited to, gaming systems, televisions, computer screens, etc. The teachings of this disclosure are not limited to the exemplary applications and environments noted above.

Figure 2:
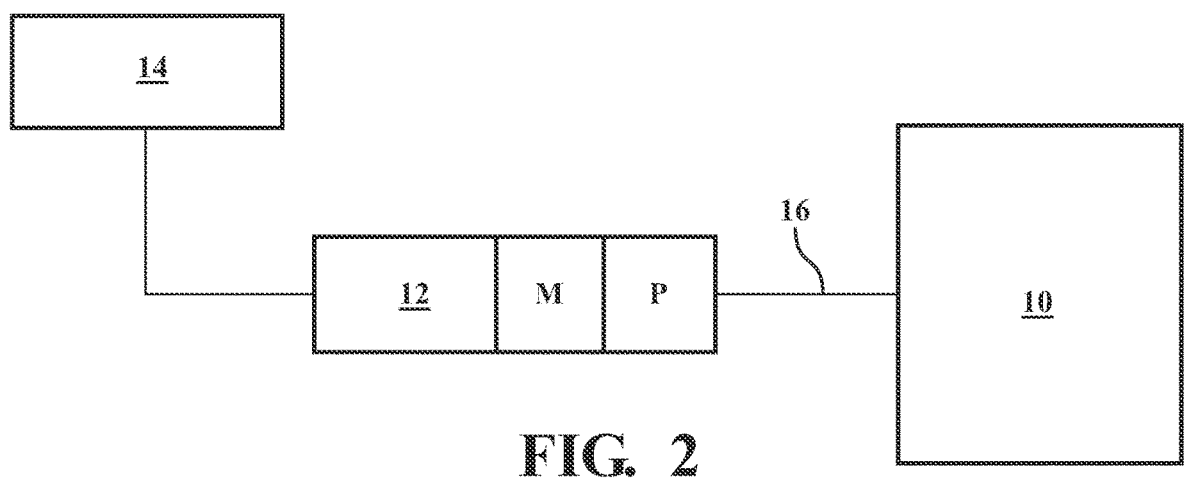
FIG. 2 is a schematic illustration of a system for adjusting light intensity for a display system in accordance with one or more of the embodiments disclosed herein.

Referring now to FIG. 2, the display system 10 may include one or more components in electrical communication with a microcontroller 12. The components of the display system 10 may be coupled to the microcontroller in a wired or wireless manner. The microcontroller 12 may include one or more processors (P), each of which may be embodied as a separate processor, an application specific integrated circuit (ASIC), a field-programmable gate array (FPGA) or another form of a dedicated electronic control unit.

The microcontroller 12 may be any sort of electronic processor (implemented in hardware, software, or a combination of both). The microcontroller 12 also includes tangible, non-transitory memory (M), e.g., read only memory in the form of optical, magnetic, and/or flash memory. For example, the microcontroller 12 may include application-suitable amounts of random-access memory, read-only memory, flash memory and other types of electrically-erasable programmable read-only memory, as well as accompanying hardware in the form of a high-speed clock or timer, analog-to-digital and digital-to-analog circuitry, and input/output circuitry and devices, as well as appropriate signal conditioning and buffer circuitry.

Computer-readable and executable instructions embodying the present method may be stored in memory (M) and executed as set forth herein. The executable instructions may be a series of instructions employed to run applications on the microcontroller 12 (either in the foreground or background). The microcontroller 12 may receive commands and information, in the form of one or more input signals, generally represented by box and numeral 14, from various controls or components in the vehicle (not shown) and communicate instructions to the display system 10 through one or more control signals 16 to control the display system 10.

The one or more control signals 16 may represent a dimming level value or command received from one or more sources. Non-limiting examples of the one or more sources may include an ambient light sensor or other vehicle component control signal, or a signal from a user actuating device. The actuating may be an engageable input device or any sort of touch screen interface. The actuating device is not limited to touchable interfaces, and thus, any known human machine interface (HMI) technique may be implemented along with the actuating device. The actuating device may be implemented by a user to request a light permeability or dimming level for the display system 10.

Referring now to FIGS. 3-6, one or more embodiments of a display system 10 are schematically displayed and described in greater detail herein. The display system 10 may include at least one light source or backlight 20 including one or more light emitting elements 22. The one or more light emitting elements 22 may include one or more light emitting diodes (LEDs) that generate and project light from the backlight to one or more components of the display system 10.

In one or more embodiments, the one or more light emitting elements 22 may be arranged in the backlight 20 in a direct-type LED arrangement or in an edge-type LED arrangement. The direct-type LED arrangement positions the one or more LEDs in an array in alignment with the one or more components of the display system to provide direct lighting for the display system 10.

The edge-type LED arrangement positions the one or more light emitting elements 22 around a perimeter of the backlight 20. The edge-type LED arrangement may include one or more reflective plates that directs light from the one or more LEDs toward the one or more components of the display system 10.

The backlight 20 and one or more light emitting elements 22 are adjustable between at least an off state and an on state to illuminate one or more components of the display system 10. In one or more embodiments, when the backlight 20 is placed in the off state, the backlight does not emit light and corresponds to zero percent (0%) light transmittance or light intensity. When the backlight is placed in an on state, the one or more light emitting elements 22 of the backlight 20 emit light corresponding to a range of light transmittance or light intensity between greater than zero percent (0%) and one hundred percent (100%) light transmittance or light intensity. The light intensity of the one or more light emitting elements 22 of the backlight 20 may be controlled by the microcontroller 12.

The backlight 20 may include a housing 24 defining at least an upper surface 26 and an opposing lower surface 28. The housing 24 may be configured to receive or cooperate with the one or more light emitting elements 22. The upper surface 26 and opposing lower surface 28 define a light pipe 30 therebetween. At least one of the upper surface 26 and the lower surface 28 of housing 24 may include one or more reflective portions 32. The one or more reflective portions 32 may be configured to direct light generated by the one or more light emitting elements 22 to the one or more components of the display system 10 and, as will be described in greater detail, redirect light reflected from reflective polarizer components provided in the display system 10 back to the one or more components of the display system 10 to increase the operational efficiency and reduce power consumption of the backlight 20.

In one or more embodiments, a diffusing element 34 may be disposed proximate the upper surface 26 of the housing 24 of the backlight 20. The diffusing element 34 cooperates with the backlight to uniformly distribute light generated by the one or more light emitting elements 22 or reflected off of the one or more reflective portions disposed on the housing of the backlight 20 to the one or more components of the display system 10 and reduce potential areas of brighter or dimmer lighting generated by the backlight 20.

The display system 10 includes a first display unit 40 disposed proximate the backlight 20. The first display unit 40 may include a shutter cell or liquid crystal layer 42 disposed between a semi-transparent or transparent upper conductive layer or upper substrate 44 and an opposing semi-transparent or transparent lower conductive layer or substrate 46. The first display unit 40 may include at least one reflective polarizer 50 cooperating with the upper substrate 44.

The liquid crystal layer 42 of the first display unit 40 may be a device such as a Thin Film Transistor (TFT) liquid crystal display (LCD), otherwise referred to as the TFT display layer. Alternatively, the first display unit 40 may be formed as another form of liquid crystal cell device configuration, such as multiplexed film compensated super twist nematic (FSTN), twisted nematic (TN), in-plane switching (IPS), multi-domain vertical alignment (MVA) or another type of liquid crystal display mode that causes light polarization rotation.

Figure 22:
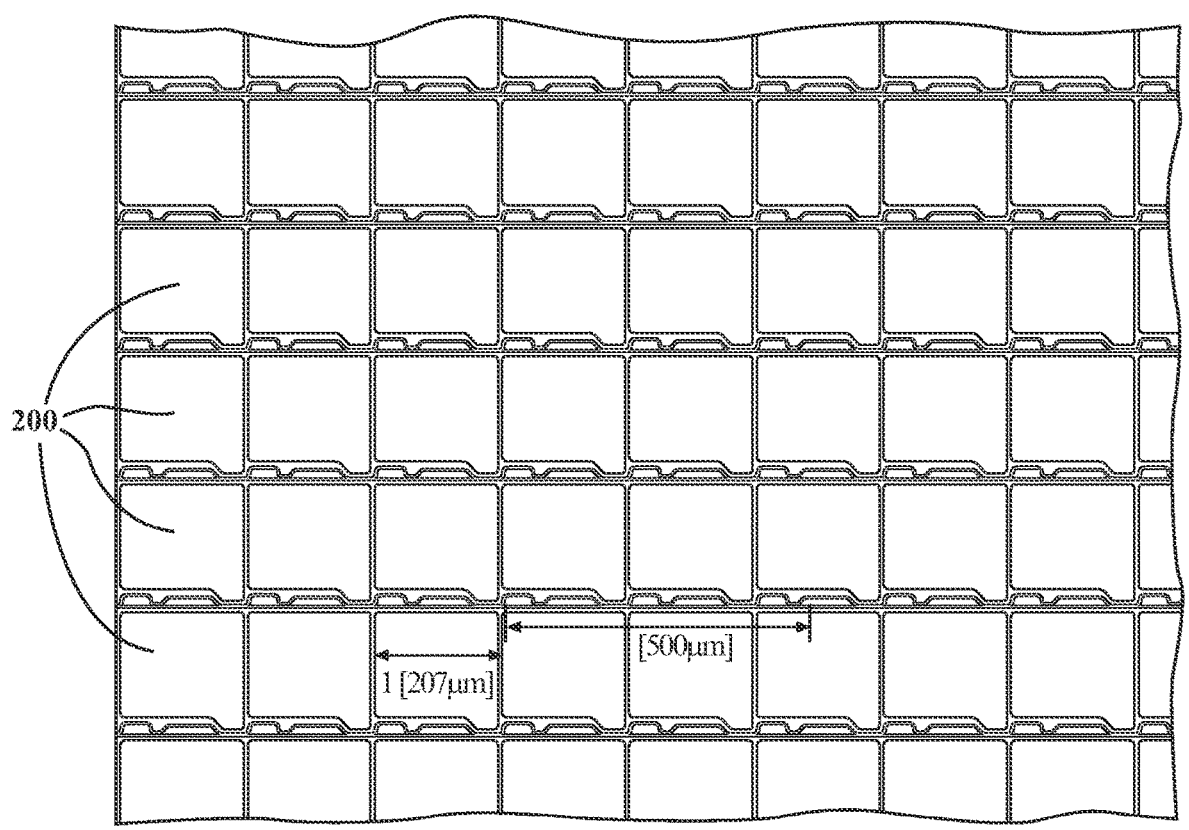
FIG. 22 schematically illustrates a top view of a liquid crystal layer of a display unit that includes a plurality of pixels arranged in a row and column format on a thin film arrangement, in accordance with the disclosure.

The liquid crystal layer 42 of the first display unit 40 may include a plurality of pixels arranged in a row and column format on a thin film arrangement. Each pixel is attached to a transistor. One embodiment of this arrangement is illustrated with reference to FIG. 22, including a plurality of the pixels 200. A charge is applied to the transistor for each pixel to adjust the state of the pixel between an actuated and non-actuated state. It is contemplated, in one or more embodiments, that the first display unit 40 will be a monochrome TFT display or a display unit having color filters removed from the display.

In general, propagating light waves generate an electric field. The electric field oscillates in a direction that is perpendicular/orthogonal to the light wave's direction of propagation. Light is unpolarized when the fluctuation of the electric field direction is random. Conversely, light may be described as polarized when fluctuation of the electric field is highly structured, with laser beams being a common example of highly-polarized light and sunlight or diffuse overhead incandescent lighting being examples of unpolarized light.

In one or more embodiments, the at least one reflective polarizer 50 includes a first reflective polarizer 50 and a second reflective polarizer 60. The first and second reflective polarizer 50, 60 may be formed as a film that is joined or coupled to the upper and lower substrates 44, 46 using an additive procedure such as an adhesive process, a bonding, and a lamination. When assembled, the first reflective polarizer 50, upper substrate 44, liquid crystal layer 42, lower substrate 46 and second reflective polarizer 60 cooperate to form the first display unit 40.

The second reflective polarizer 60 may be configured to only allow light directed from the backlight 20 with the correct polarization angle to pass through the second reflective polarizer 60. Conversely, light directed from the backlight 20 that is not of the correct polarization angle is reflected back by the second reflective polarizer 60.

Figure 3:
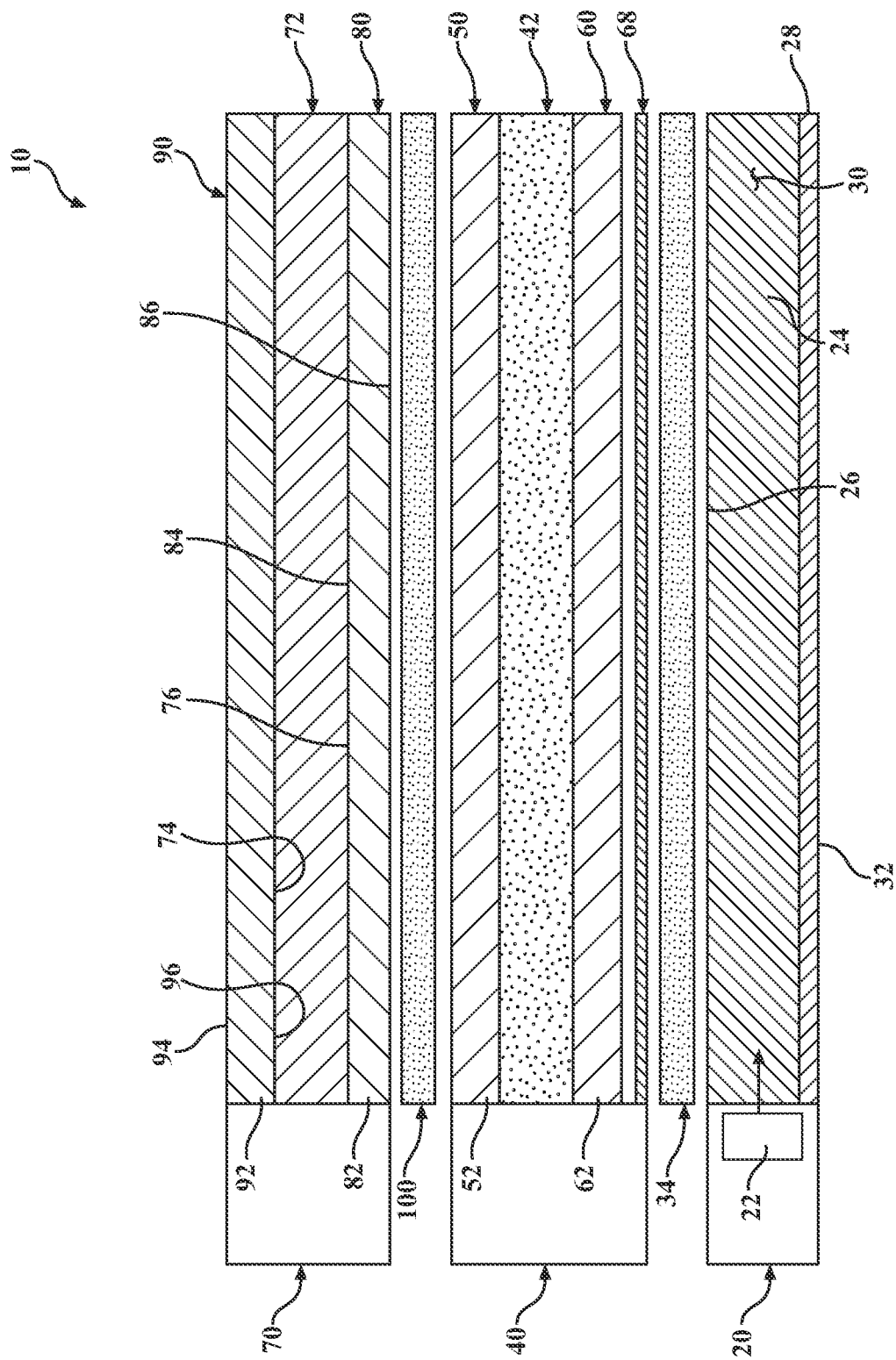
FIG. 3 is a schematic side view of the display system constructed in accordance with one or more of the embodiments disclosed herein.

The first reflective polarizer 50 includes a body 52 having an upper surface 54 and an opposing lower surface 56 that cooperates with the upper substrate 44 of the first display unit 40. The second reflective polarizer 60 includes a body 62 including an upper surface 64 cooperating with the lower substrate 46 of the first display unit 40 and an opposing lower surface 66. The first reflective polarizer 50 and second reflective polarizer 60 may each include a reflective polarizer film bonded or otherwise attached to one or more surfaces of the first reflective polarizer 50 and second reflective polarizer 60. As is shown in FIG. 3, the lower surface 66 of the second reflective polarizer 60 may cooperate with a brightness enhancing film (BEF) 68.

Two classes of reflective polarizer materials that may be used for cooperating with the first reflective polarizer 50 and second reflective polarizer 60, or in the construction of the first reflective polarizer 50 and the second reflective polarizer 60, may include commercially available as 3M™ Reflective Polarizer Mirror (RPM) and 3M™ Windshield Combiner Film (WCF), both available from THE 3M COMPANY, with headquarters located in Maplewood, Minn. Other reflective polarizer materials having similar properties such as wire grid polarizers may be used to form the first and second reflective polarizer 50, 60 in other embodiments.

The display system 10 additionally includes a second display unit 70 disposed proximate the first display unit 40. The second display unit 70 may include a TFT display layer 72 having an upper substrate 74 and an opposing lower substrate 76. The TFT display layer 72 may be configured as a TFT display or may be formed as a device such as, a Liquid Crystal Display (LCD) or the like, for use as a digital presentation device to display content, such as a group of virtual or reconfigurable instruments that display operational information of the vehicle.

In one or more embodiments, the TFT display layer 72 of the second display unit 70 may include a liquid crystal display disposed between the upper substrate 74 and the lower substrate 76. The substrates 74, 76 of the second display unit 70 may be formed from glass and provide a structure on which to apply additive materials such as a color filter, for example.

At least one linear polarizer 80 may cooperate with the TFT display layer 72 to form the second display unit 70. The at least one linear polarizer 80 may be formed as a film that cooperates with one or more of the upper substrate 74 and the lower substrate 76 of the second display unit 70. Linear polarizers are polarizers designed to linearly polarize incoming light and absorb light that is not in the correct polarization angle. Passing white light through a linear polarizer blocks half of the incident light, causing the electric field component to displace so that it oscillates in only one plane with respect to the direction of propagation.

In one or more embodiments, the at least one linear polarizer 80 may include a first linear polarizer 80 and a second linear polarizer 90. The first linear polarizer 80 includes a body 82 including an upper surface 84 cooperating with the lower substrate 76 of the second display unit 70 and an opposing lower surface 86.

The second linear polarizer 90 includes a body 92 having an upper surface 94 and an opposing lower surface 96 cooperating with the upper substrate 74 of the second display unit 70. The first and second linear polarizer 80, 90 may be joined or coupled to the TFT display layer 72 and substrates 74, 76 to form the second display unit 70 using an additive procedure such as an adhesive process, a bonding, and a lamination.

The first linear polarizer 80 may be configured to allow light transmitted from the backlight 20 to pass through to the TFT display layer 72. Conversely, the second linear polarizer 90 may be configured to control the emittance of light from the TFT display layer 72. In one or more embodiments, transmission axes of the first reflective polarizer 50 and the second reflective polarizer 60 are aligned with a transmission axis of the first linear polarizer 80. In one or more embodiments, the transmission axis of the first reflective polarizer 50 aligned with the transmission axis of the first linear polarizer 80.

In one or more embodiments, a diffuser 100 may be provided in the display system 10 and disposed between at least the first display unit 40 and the second display unit 70. In the embodiments shown in the Figures, the diffuser 100 may be disposed and positioned between the upper surface 54 of the first reflective polarizer 50 and the lower surface 86 of the first linear polarizer 80. The diffuser 100 may provide a Gaussian-like luminance profile transition for light transmitted through the first display unit 40, such that any edges between the lit pixels of the first display unit 40 and unlit pixels of the first display unit 40 fades gradually. Unlike a sharp luminance transition that is more noticeable to a user, the Gaussian-like luminance profile transition created by the diffuser creates a more gradual fade profile that is more difficult for the user to discern the edges between the lit and unlit pixels of the first display unit 40.

Figure 4:
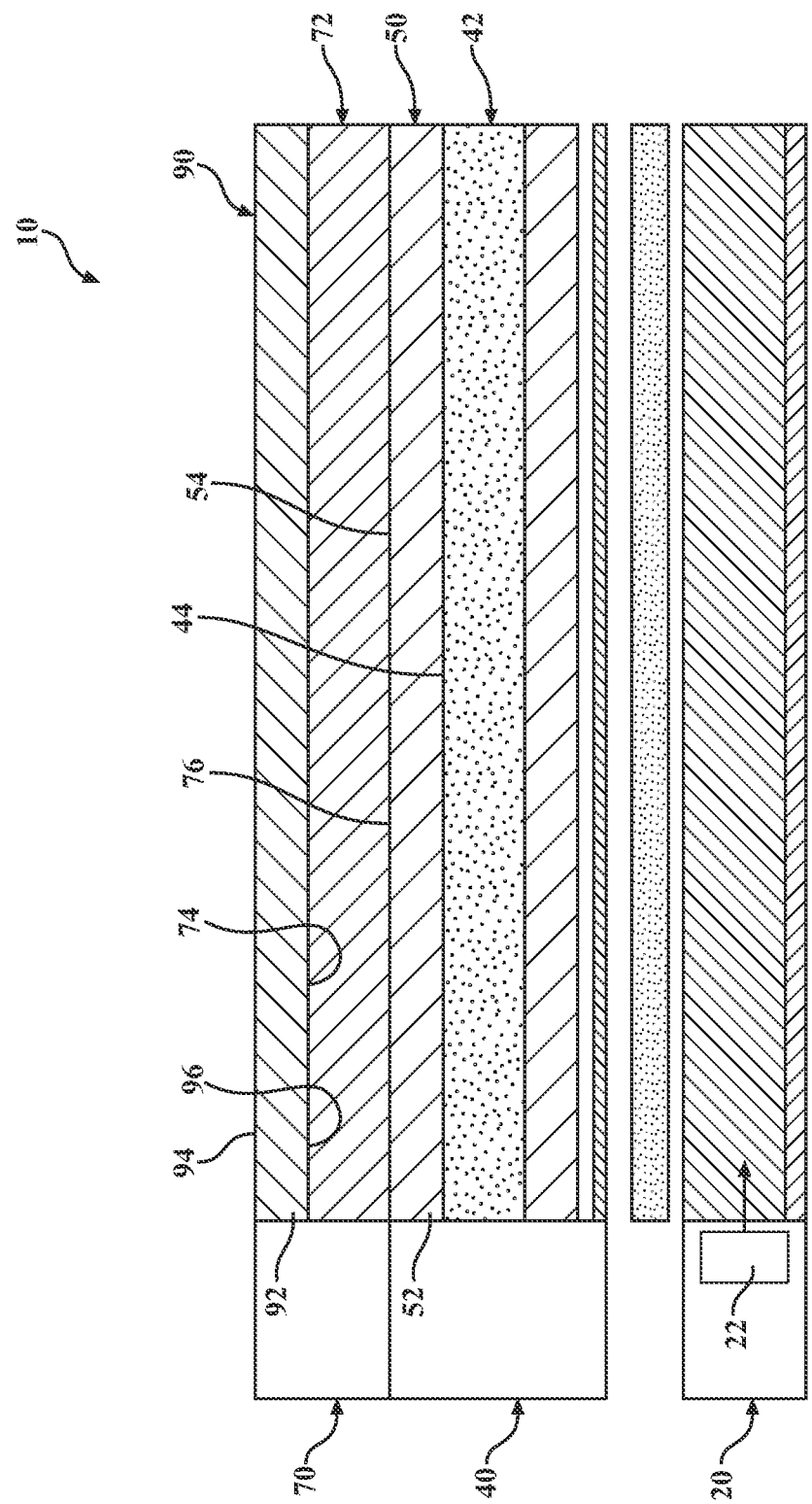
FIG. 4 is a schematic side view of the display system constructed in accordance with an alternative embodiment disclosed herein.

In an alternative embodiment of the display system 10 shown in FIG. 4, the first display unit 40 is positioned proximate the second display unit 70. The second display unit 70 includes a linear polarizer 90 with a body 92 having an upper surface 94 and an opposing lower surface 96 cooperating with the upper substrate 74 of the second display unit 70. The upper surface 54 of the first reflective polarizer 50 cooperates with the lower substrate 76 of the second display layer 70 to control the emittance of light projected from the one or more light emitting elements 22 and backlight 20 through the first display unit 40 into the TFT display layer 72 of the second display unit 70. The first reflective polarizer 50 may be joined or coupled to the upper substrate 44 of the first display unit 40 and the lower substrate 76 of the second display unit 70 using an additive procedure such as an adhesive process, a bonding, and a lamination.

Figure 5:
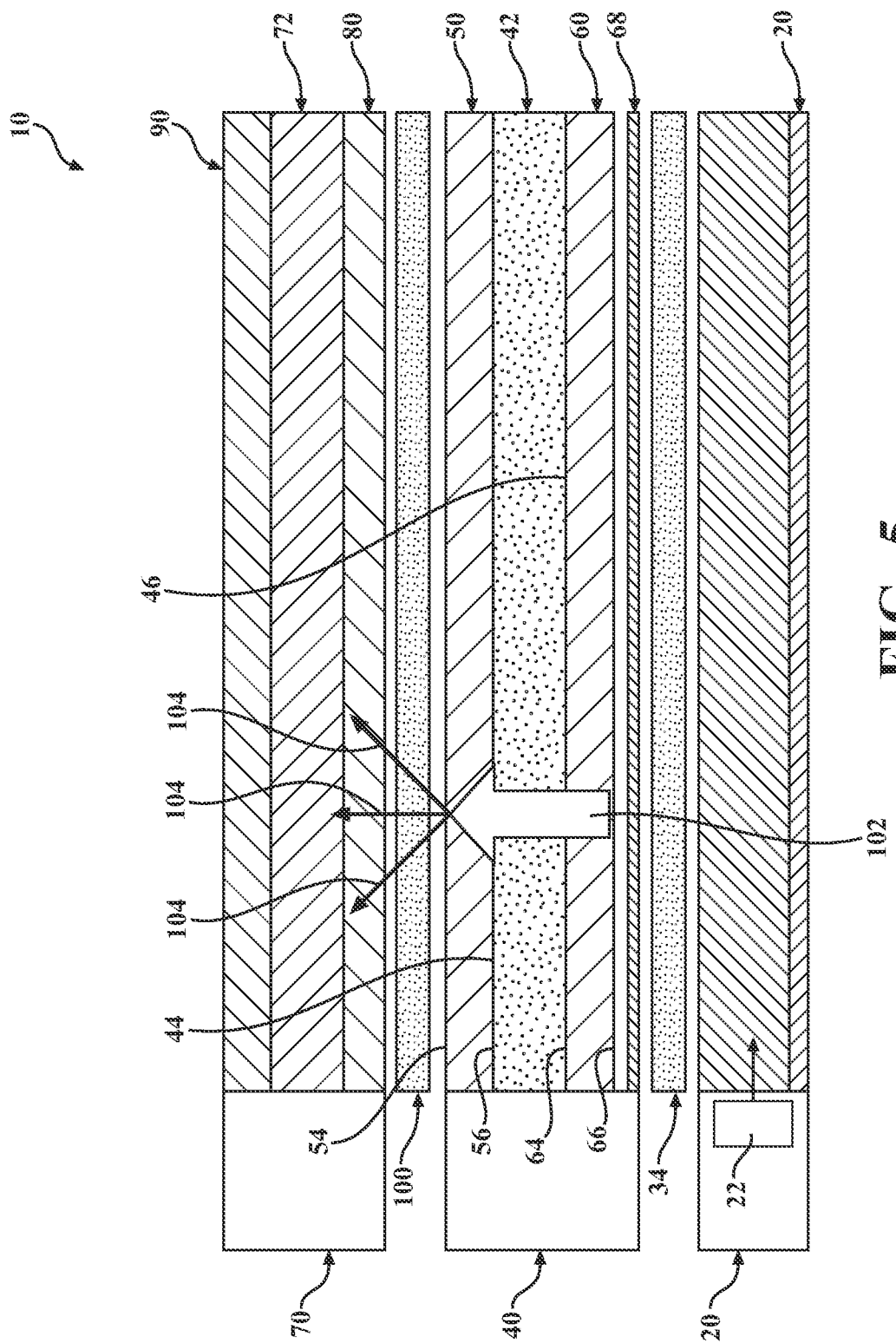
FIG. 5 is a schematic side view of the display system illustrating projection of light through the one or more reflective polarizers in connection with one dimming mode of the display constructed in accordance with one or more of the embodiments disclosed herein.

Referring now to FIG. 5, the display system 10 is shown in at least a first configuration, wherein light is projected from the backlight 20 through the one or more components of the display system 10. In this first configuration, the first display unit 40 is placed in a first transmissive state or driven state. In the first transmissive state, polarized light, generally represented by arrow 102, is projected through the first display unit 40 without adjustment or treatment by the liquid crystal layer 42 or one or more of the first reflective polarizer 50 and second reflective polarizer 60.

The polarized light 102 projects through the first reflective polarizer 50 to the diffuser 100, where the light is diffused and distributed in a generally uniform fashion as represented by arrows 104 for projection through the first liner polarizer 80 and TFT display layer 72. The TFT display layer 72 of the second display unit 70, in response to one or more control signals 16 from the microcontroller 12 shown in FIG. 2, may render one or more display features or content resulting in an image that will be projected by the light 102 passing therethrough.

In one or more embodiments, if all the layers or components of the display system 10 are laminated together and aligned at the pixel level, local zones could be produced by the first display unit 40 that may be larger by a factor of about 2 times to about 9 times to adjust or align tolerances, thereby reducing or providing a constrained halo zone of light that will be difficult to see due to the luminance of the adjacent transmitting pixel.

Figure 6:
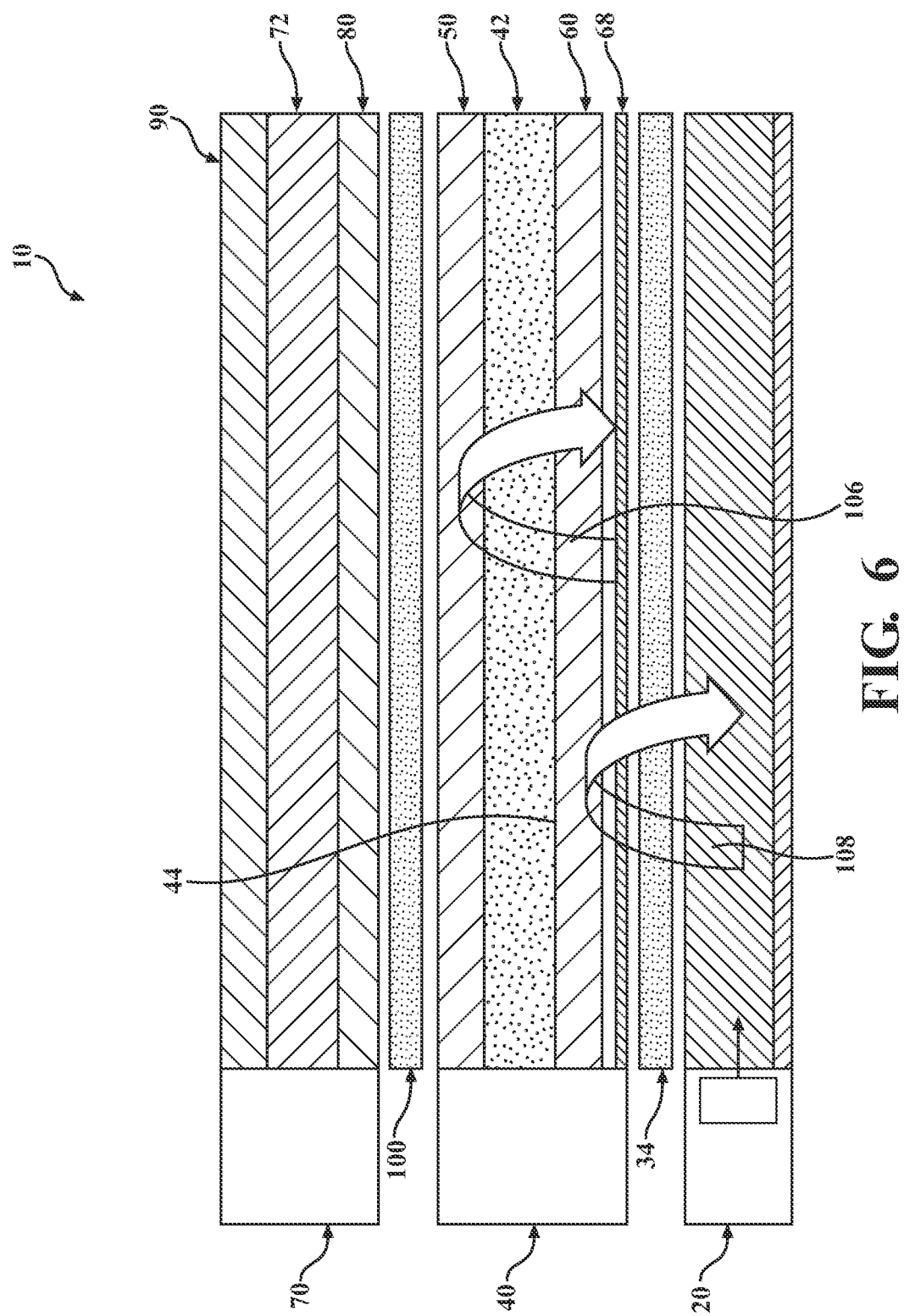
FIG. 6 is a schematic side view of the display system illustrating projection of light through the one or more reflective polarizers in connection with another dimming mode of the display constructed in accordance with one or more of the embodiments disclosed herein.

Referring now to FIG. 6, the display system 10 is shown in at least a second configuration, wherein the first display unit 40 is placed in a second transmissive state or undriven state. In the second transmissive or undriven state, the microcontroller 12 as shown in FIG. 2, via one or more control signals 16, in response to one or more input signals 14 instructs the display system 10 to adjust the dimming level of the display system 10.

The liquid crystal layer 42 of the first display unit 40, in response to the one or more control signals 16, is configured to rotate polarized light received from the backlight 20 by 90 degrees, as is represented by arrow 106. The first display unit 40, as a pixelated TFT display, may be dynamically configured to cause individual pixels to either rotate or not rotate the polarized light. This dynamic control produces a local dimming backlight feature at the pixel level.

In one non-limiting example, in a first transmissive state or driven state, about ninety percent (90%) of the polarized light 102 projected through the second reflective polarizer 60 may be transmitted through the first reflective polarizer 50 to the second display unit 70 to display an image. About ten percent (10%) of the polarized light projected through the second reflective polarizer 60 may be reflected.

In another non-limiting example, in a second transmissive or undriven state, polarized light 106 is rotated 90 degrees by the liquid crystal layer 42 and is reflected by the first reflective polarizer 50 and redirected to be rotated another 90 degrees or undergo a 90 degree twist through the liquid crystal layer 42. In response to the 90 degree twist of the polarized light 106 through the liquid crystal layer 42, the polarized light 106 is aligned to the transmission axis of the second reflective polarizer 60 and is therefore transmitted back into the backlight 20 for recycling and reuse by the display system 10.

In yet another non-limiting example, in a second transmissive or undriven state, about zero percent (0%) of the orthogonal polarized light is transmitted by the first reflective polarizer 50 to the second display unit 70 such that almost no light will pass to the second display unit 70, providing at least a contrast ratio of about 10,000:1. The light 108, whose polarization is orthogonal to the transmission axis of the second reflective polarizer 60, is reflected back into the backlight 20 for recycling and reuse by the display system 10.

About ninety percent (90%) of the reflected light 106 will transmit through the second reflective polarizer 60 into the backlight 20 for reprocessing. As a result, about eighty-one percent (81%) of the reflected light will be recycled for the pixels in the undriven state of the first display unit 40. Since about 81% of the light is recycled for undriven pixels in the first display unit 40, a greater amount of light will be recycled compared to an exemplary display, wherein a linear polarizer absorbs the light.

The microcontroller 12 cooperates with the display system 10 to dynamically control the backlight luminance to assure that the luminance level stays constant. The microcontroller 12 may control the luminance by adjusting the voltage levels supplied to the TFT cells in the liquid crystal layer 42 of the first display unit 40 to locally dim the display system 10.

In one or more embodiments, the transmission axis of the first reflective polarizer 50 is aligned with a transmission axis of the first linear polarizer 80. The transmissivity state of the display system 10 may be adjusted to one or more configurations as set forth in the table below. Examples 1 and 2 contemplate an arrangement wherein the transmission axes of the first reflective polarizer 50 and second reflective polarizer 60 are aligned in parallel. Examples 3 and 4 contemplate an arrangement wherein the transmission axes of the first reflective polarizer 50 and second reflective polarizer 60 are cross aligned. The liquid crystal layer 42 of the first display unit 40 is pixelated such that each pixel may be dynamically configured to optically rotate, that is, either rotate or not rotate, polarized light, thereby producing a local dimming backlight at the pixel level:

| Reflective Polarizer Transmission Axis Orientation | Undriven State Polarized Light Rotation | Driven State Polarized Light Rotation |
|---|---|---|
| Example 1 - Parallel | 90° | 0° |
| Example 2 - Parallel | 0° | 90° |
| Example 3 - Cross | 90° | 0° |
| Example 4 - Cross | 0° | 90° |

In one or more embodiments described herein and as set forth in non-limiting Example 1 in the table above. In Example 1, polarized light is rotated 90 degrees when the liquid crystal layer 42 of the first display unit 40 is in an undriven state and the first reflective polarizer 50 and second reflective polarizer 60 are aligned in parallel. Conversely, in Example 3, polarized light is rotated 90 degrees when the liquid crystal layer 42 of the first display unit 40 is in an undriven state and the first reflective polarizer 50 and second reflective polarizer 60 are cross aligned. It is understood that, in an arrangement where the first reflective polarizer 50 and second reflective polarizer 60 are cross aligned, the first reflective polarizer 50 and first linear polarizer 80 are aligned in parallel.

Figure 7:
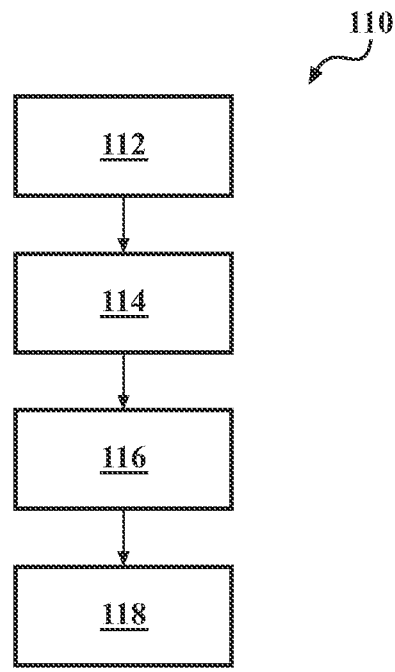
FIG. 7 is a flow chart illustrating a method for adjusting light intensity of the display system in accordance with one or more embodiments disclosed herein.

Referring now to FIG. 7, the disclosed display system and the various teachings set forth above may be used as part of a method of adjusting light intensity by repurposing or recycling light using the display system 10, generally referenced as 110, is described in greater detail. At block 112, the microcontroller 12 in FIG. 2 receives one or more input signals to render content in a display image on the display system 10 and transmit a signal representative of at least a first light intensity value to the one or more light emitting elements to generate and project light at the first intensity value from the backlight to the first display unit.

In one or more embodiments, the one or more input signals may be representative of values or measurements of the operating states of at least one component of a vehicle, including, but not limited to, output from the vehicle speed sensor, and the like. The microcontroller 12 may propagate the commands and information received in the one or more input signals and render the content as a display image associated with the speed of the vehicle as a virtual speedometer. The one or more input signals may additionally include input signals received from an actuating device or an ambient light sensor to generate the display image with a lighting or contrast level, such as a contrast level of about seventy percent (70%) black content for the displayed image.

At block 114, the microcontroller 12 may command the pixelated liquid crystal layer 42 of the first display unit 40 to adjust between at least a first transmissive state and a second transmissive state. The pixelated liquid crystal layer 42 is dynamically configured to optically rotate polarized light when adjusted between the first transmissive state and the second transmissive state to produce a local dimming backlight through the first display unit 40 at the pixel level. The microcontroller 12 may command the liquid crystal layer 42 of the first display unit 40 to adjust between at least a first transmissive state and a second transmissive state based on a variety of factors, including the configuration or type and quantity of components, such as the number of reflective polarizers, diffusers and the like, provided in the display system 10. For example, the adjustment command by the microcontroller 12 may be based upon a display system 10 configuration having a first reflective polarizer 50 cooperating with the first display unit 40.

The adjustment calculation or command may also take other factors into consideration, including, but not limited to, whether light entering the first display unit 40 is polarized and adjusting resolution of the first display unit by a factor of about nine (9) to increase the aperture ratio so that the light obstruction caused by the metalized column lines and row lines of the TFT cell structure of the liquid crystal layer 42 is evaluated. The factor of about nine (9) disclosed above results in a calculation that area of nine color TFT pixels on the TFT display layer 72 of the second display unit 70 has a local dimming area of one TFT pixel on the liquid crystal layer 42 of the first display unit 40. Alternatively, the resolution of the first display unit may be adjusted by a factor that ranges between one (1) and twenty five (25) to increase the aperture ratio. An example of this evaluation is reproduced in the chart below:

| | Transmission | Notes |
|---|---|---|
| Reflective polarizer (50) | 0.9 | 3M RPM data |
| Monochrome TFT (42) | 0.95 | 1-50%/9 for reduced resolution |
| Total Transmission | 0.855 | Does not include rear polarizer that is part of a normal backlight |

At block 116, the microcontroller 12 may calculate the amount of recycled or reprocessed light generated by the display system 10. The amount of recycled or reprocess light may be subject to factors including, but not limited to, the transmissive state of the liquid crystal layer 42 of the first display unit 40, the number and position of reflective polarizers 50, 60, and the like. In one non-limiting example, the amount of light that may be recycled to the backlight 20 is about fifty-four percent (54%). A representative calculation is shown below:

| | | Notes |
|---|---|---|
| Recycled light | 0.7 | 70% black 30% white assumption |
| monochrome TFT AR | 0.95 | AR = Aperture Ratio |
| RPM recycle efficiency | 0.81 | |
| Recycled light | 0.53865 | 54% of light is recycled |

The amount of light that is recycled by the display system 10 may be dependent on the type of content to be displayed or rendered in an image. The content of the rendered image may change dynamically. As such, the microcontroller 12 of the display system dynamically adjusts the output of the backlight 20 in response to feedback control from one or more components of the display system 10 or in response to calculations stored with executable instructions in the microcontroller 12.

At block 118, the microcontroller 12 may determine the amount of light generated by the backlight 20 relative to a backlight 20 cooperating with at least one reflective polarizer 50 and transmit a signal representative of at least a second light intensity value to the one or more light emitting elements 22 to generate and project light at the second light intensity value from the backlight 20 to the first display unit 40 to display the rendered image on the second display unit 70. In one non-limiting example shown in the table below, the first display unit 40 containing the liquid crystal layer 42 and at least one reflective polarizer 50 has a transmission of about eighty-five and one-half percent (85.5%). As a result, the microcontroller 12 may increase, the backlight 20 light output a factor of 1.17 to make up for the loss created by presence of the liquid crystal layer 42 and at least one reflective polarizer 50 of the first display unit 40.

Since fifty-four percent (54%) of the light is recycled by the display system 10, the microcontroller 12 estimates that about fifty percent (50%) of the recycled light returning to the backlight 20 may be recycled to exit the backlight 20 in the correct polarization. It is understood that the actual amount of light exiting the backlight 20 may vary depending of the recycling efficiency of the backlight structure. As such, the microcontroller 12 can reduce the backlight output to about seventy-three percent (73%) of the original backlight output, resulting in a total of about eighty-five percent (85%) of the light required compared to a conventional backlight.

|  | Relative Amount of Backlight Light Required | Notes |
|---|---|---|
| Factor for monochrome | 1.16959064 | =1/.855 |
| Factor for recycling | 0.73 | 1-.54/2 |
| Total | 0.854 | 85% of the light is needed, as compared to a normal backlight due to recycling |

The resultant lower backlight output provides a more energy efficient, lower power consumption display system 10.

A diffuser film is now described. In the embodiments shown in the Figures, the diffuser 100 may be disposed and positioned between the upper surface 54 of the first reflective polarizer 50 and the lower surface 86 of the first linear polarizer 80. The diffuser 100 provides a Gaussian-like luminance profile transition so that the edge between the lit pixels and unlit pixels fades gradually making it more difficult for the eye to discern. A sharp luminance transition is more noticeable and therefore a more gradual fade profile may be more desirable. There are several approaches that may be utilized for the diffusion element, as described with reference to FIGS. 8-13.

Figure 8:
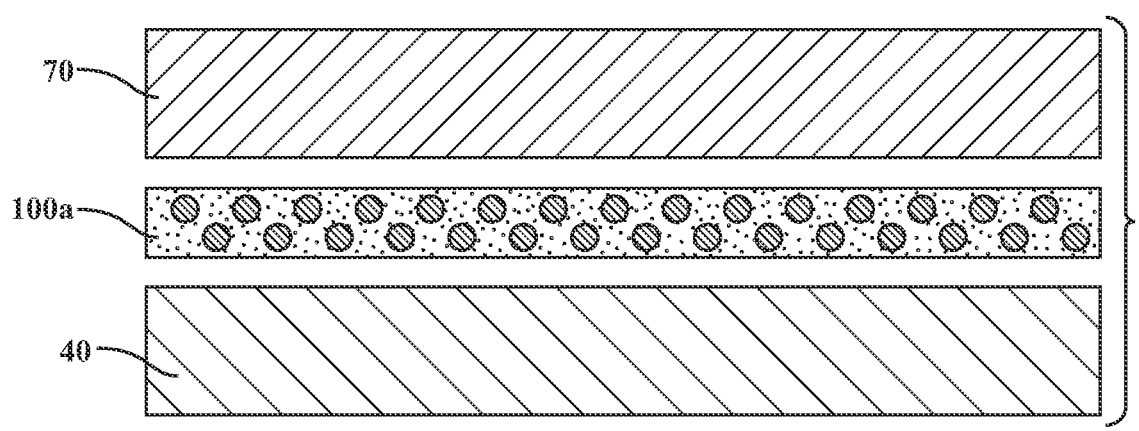
FIG. 8 schematically shows a portion of the display system including the second display unit disposed proximate to the first display unit with an interposed diffuser that is arranged as a film, such as polycarbonate, with a light scattering agent added to the base material in accordance with the disclosure.

FIG. 8 schematically shows a portion of the display system 10 including the second display unit 70 disposed proximate to the first display unit 40 with a first embodiment of the diffuser 100a interposed therebetween. In this embodiment, the diffuser 100a is arranged as a film, such as polycarbonate, TAC, COP, or another non-birefringent material, with a light scattering agent added to the base material. The light scattering agent is a form of a light diffusion element, which may be added to the plastic film stock material before extrusion into a diffusion film. The light diffusion element may be reflective in nature or diffractive in nature or a combination thereof to scatter the light.

Figure 9:
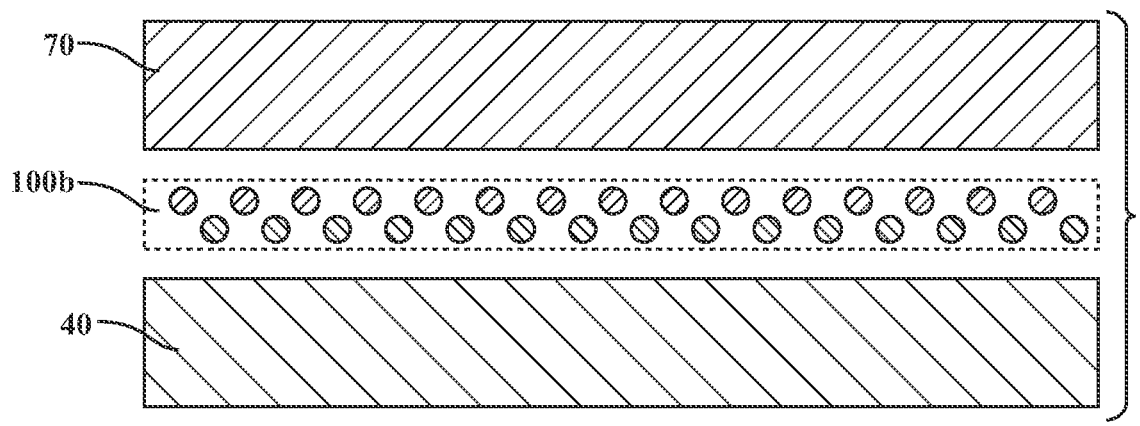
FIG. 9 schematically shows a portion of the display system including the second display unit disposed proximate to the first display unit with an interposed diffuser that is arranged as an Optically Clear Adhesive (OCA) with light diffusion particles, e.g., beads, added thereto in accordance with the disclosure.

FIG. 9 schematically shows a portion of the display system 10 including the second display unit 70 disposed proximate to the first display unit 40 with a second embodiment of the diffuser 100b interposed therebetween. In this embodiment, the diffuser 100b is arranged as an Optically Clear Adhesive (OCA) with light diffusion particles, e.g., beads, added thereto. The light diffusion particles may be reflective in nature or diffractive in nature or a combination thereof to scatter the light. The light diffusion particles are fabricated to have a different index of refraction than the OCA, and may be transparent or translucent.

Figure 10:
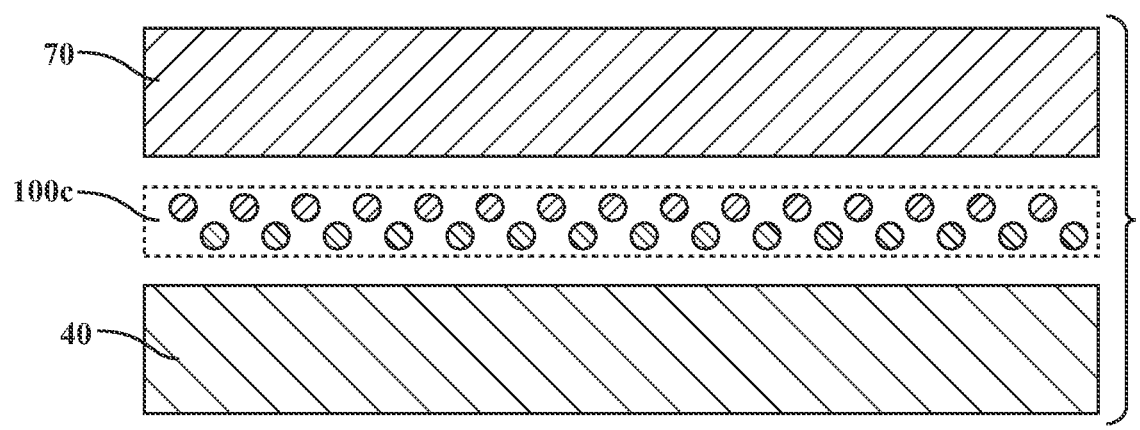
FIG. 10 schematically shows a portion of the display system including the second display unit disposed proximate to the first display unit with an interposed diffuser that is arranged as a Liquid Optically Clear Adhesive (LOCA) with light diffusion particles, e.g., beads, added thereto in accordance with the disclosure.

FIG. 10 schematically shows a portion of the display system 10 including the second display unit 70 disposed proximate to the first display unit 40 with a third embodiment of the diffuser 100c interposed therebetween. In this embodiment, the diffuser 100c is arranged as a Liquid Optically Clear Adhesive (LOCA) with light diffusion particles, e.g., beads, added thereto. The light diffusion particles may be reflective in nature or diffractive in nature or a combination thereof to scatter the light. The light diffusion particles are fabricated to have a different index of refraction than the LOCA, and may be transparent or translucent.

Figure 11:
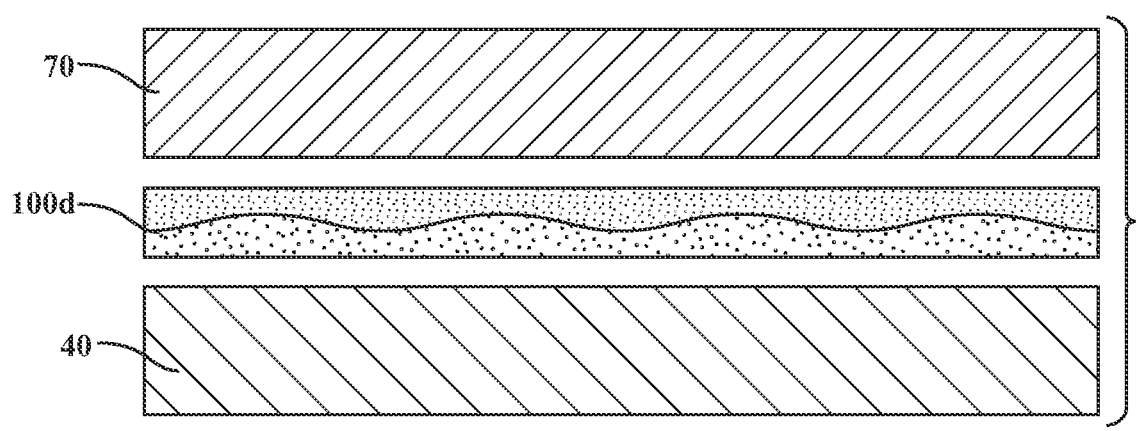
FIG. 11 schematically shows a portion of the display system including the second display unit disposed proximate to the first display unit with an interposed diffuser that is arranged as an anti-sparkle Optically Clear Adhesive (OCA) film in accordance with the disclosure.

FIG. 11 schematically shows a portion of the display system 10 including the second display unit 70 disposed proximate to the first display unit 40 with a fourth embodiment of the diffuser 100d interposed therebetween. In this embodiment, the diffuser 100d is arranged as an anti-sparkle Optically Clear Adhesive (OCA) film. The anti-sparkle OCA film is based on a 2-dimensional diffraction grating structure that replicates the light from each sub-pixel into nine equally lit dots, in one embodiment. The effect of the anti-sparkle film is to attenuate the higher frequency elements of the light.

Figure 12:
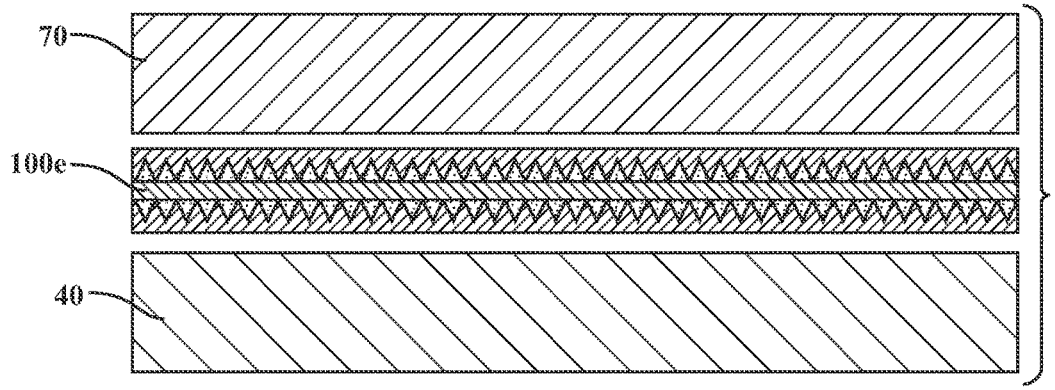
FIG. 12 schematically shows a portion of the display system including the second display unit disposed proximate to the first display unit with an interposed diffuser that is arranged as a surface diffuser film having index-mismatched LOCA material in accordance with the disclosure.

FIG. 12 schematically shows a portion of the display system 10 including the second display unit 70 disposed proximate to the first display unit 40 with a fifth embodiment of the diffuser 100e interposed therebetween. In this embodiment, the diffuser 100e is a surface diffuser film having index-mismatched LOCA material. The effect of employing the surface diffuser film in conjunction with index-mismatched LOCA material is to scatter light. Silicone-based LOCA materials have an index of refraction of around 1.41. Therefore in conjunction with a plastic surface diffuser sheet with an index of refraction in the 1.5 to 1.6 range, the index mismatch will cause diffraction of light to occur and therefore provide a diffusion function.

Figure 13:
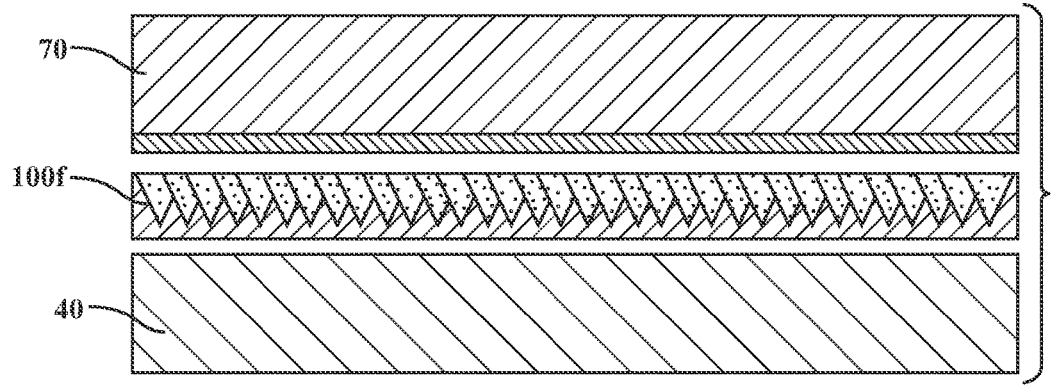
FIG. 13 schematically shows a portion of the display system including the second display unit disposed proximate to the first display unit with an interposed diffuser that is arranged as an anti-glare polarizer film employing an optically index mismatched LOCA to bond to the polarizer film in accordance with the disclosure.

FIG. 13 schematically shows a portion of the display system 10 including the second display unit 70 including the first linear polarizer 80 disposed proximate to the first display unit 40 with a fifth embodiment of the diffuser 100f interposed therebetween. In this embodiment, the diffuser 100f is an anti-glare polarizer film employing an optically index mismatched LOCA to bond to the polarizer film that is disposed on the first linear polarizer 80. When polarizer film with an antiglare surface is used in conjunction with an index mismatched LOCA, diffraction and associated light scattering will occur.

Figure 14:
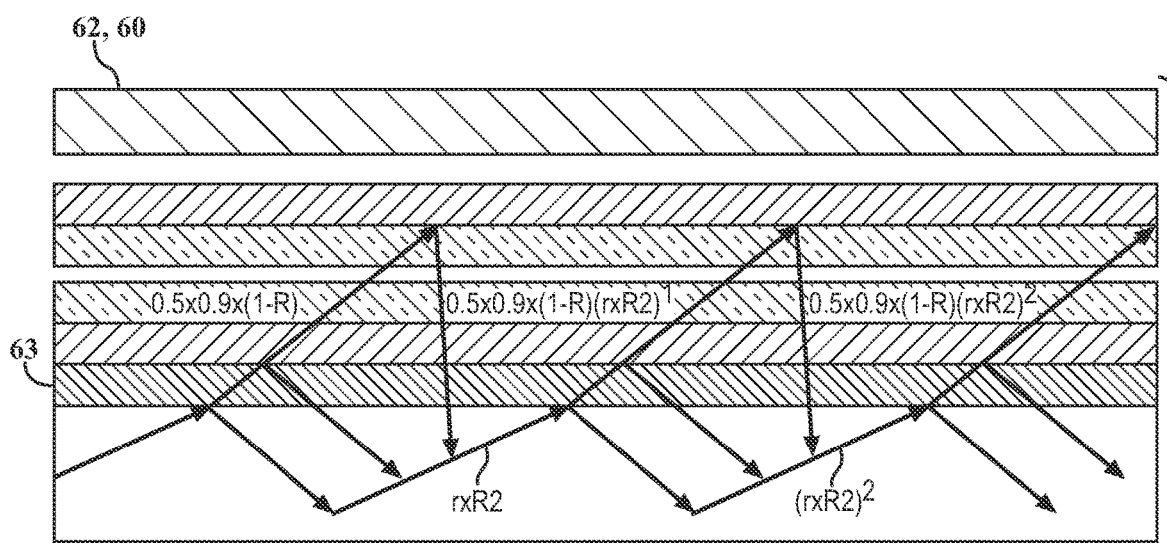
FIG. 14 schematically shows an embodiment of an anti-reflection film that is interposed between a lower surface of the second reflective polarizer and the brightness enhancing film (BEF) in accordance with the disclosure.

An anti-reflection film is now described. An anti-reflection (AR) film or coating may be employed to cancel light reflections to improve system efficiency. FIG. 14 schematically shows an embodiment of the anti-reflection film 63, which may be interposed, in one embodiment, between the lower surface 66 of the second reflective polarizer 60 and the brightness enhancing film (BEF) 68. The rear side of the rear RPM film may have an AR coating applied in order to increase system efficiency. In one embodiment, the anti-reflection film 63 is a moth-eye-type AR film which may improve the luminance by 3.4% with 100% recycling of the light.

Matrix structures surrounding each pixel include as follows. An outer periphery of each of the pixels may be surrounded by a matrix structure, which acts on the light passing through the monochrome cell, i.e., the first display unit 40 in the form of the monochrome TFT display.

Figure 15:
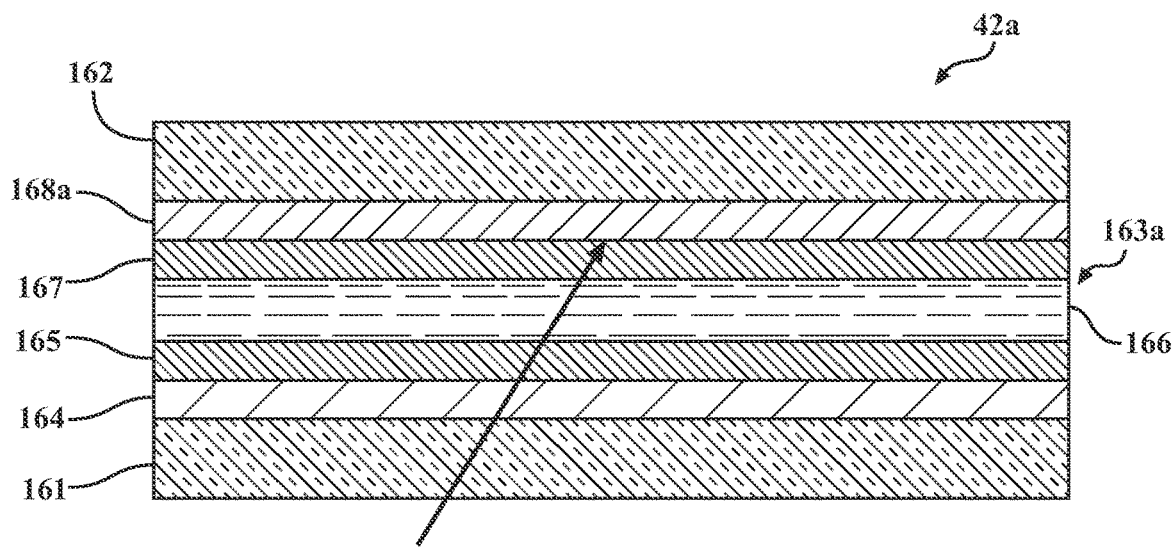
FIGS. 15-21 each schematically shows a cross-sectional view of the matrix structure area including various embodiments of a liquid crystal layer, including a first glass substrate that is contiguous to a second glass substrate and separated by a matrix structure, in accordance with the disclosure.

FIG. 15 schematically shows a cross-sectional view of the matrix structure area including a first embodiment of the liquid crystal layer 42*a*, including a first glass substrate 161 that is contiguous to a second glass substrate 162 and separated by a matrix structure 163*a*. The matrix structure 163*a* includes an active plane TFT structure 164 that includes capacitors and wiring traces, and an LCD element 166 that is disposed between first and second alignment layers 165, 167, respectively. In this embodiment, a black matrix element 168*a* is disposed immediately contiguous to the second glass substrate 162. Light is primarily absorbed by the active plane TFT structure 164 and the black matrix element 168*a*.

Figure 16:
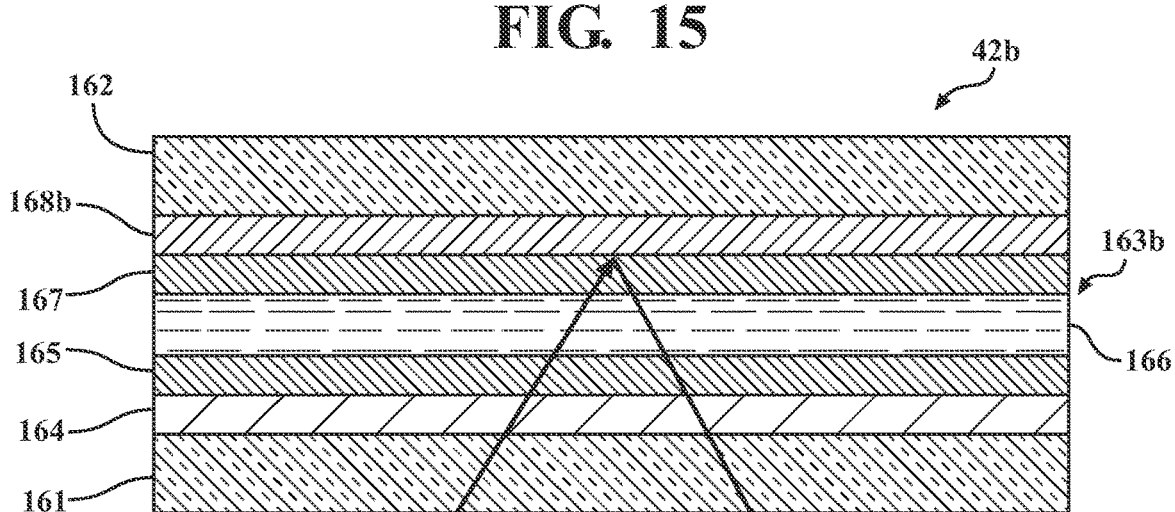

FIG. 16 schematically shows a cross-sectional view of the matrix structure area including a second embodiment of the liquid crystal layer 42*b*, including the first glass substrate 161 that is contiguous to the second glass substrate 162 and separated by the matrix structure 163*b*. The matrix structure 163*b* includes the active plane TFT structure 164 that includes capacitors and wiring traces, and the LCD element 166 that is disposed between first and second alignment layers 165, 167, respectively. In this embodiment, a reflective matrix element 168*b* is disposed immediately contiguous to the second glass substrate 162. Light may be absorbed by the active plane TFT structure 164, but is reflected by the reflective matrix element 168*b*. The reflective matrix element 168*b* may be fabricated by the deposition of a reflective metal such as molybdenum commonly used in the manufacturing of TFT cells. This reflective structure reflects the light back into the backlight for recycling.

Figure 17:
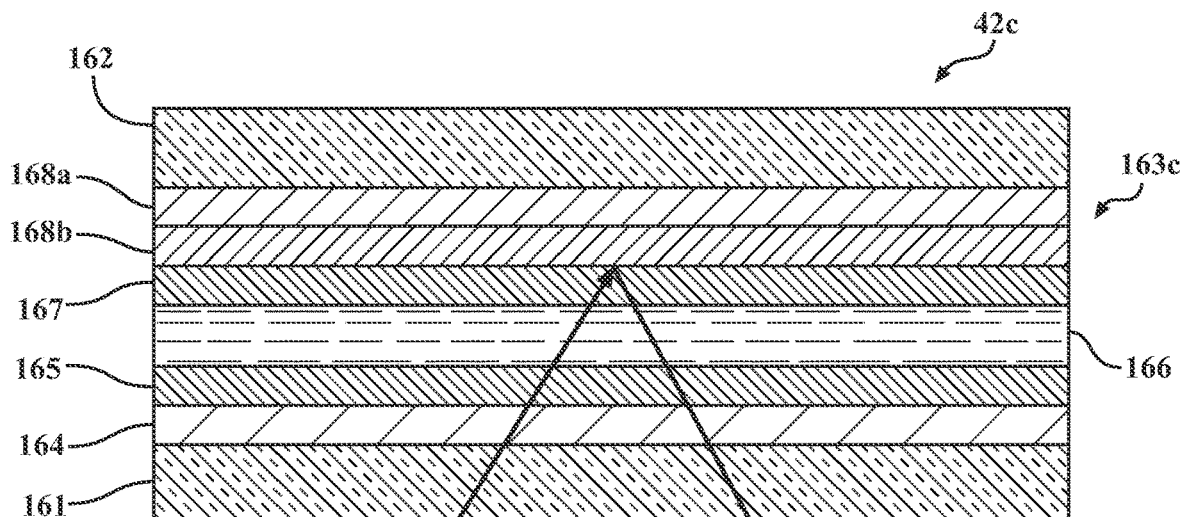

FIG. 17 schematically shows a cross-sectional view of the matrix structure area including a third embodiment of the liquid crystal layer 42*c*, including the first glass substrate 161 that is contiguous to the second glass substrate 162 and separated by the matrix structure 163*c*. The matrix structure 163*c* includes the active plane TFT structure 164 that includes capacitors and wiring traces, and the LCD element 166 that is disposed between first and second alignment layers 165, 167, respectively. In this embodiment, the black matrix element 168*a* is disposed immediately contiguous to the second glass substrate 162, and the reflective matrix element 168*b* is disposed between the black matrix element 168*a* and the second alignment layer 167. Light may be absorbed by the active plane TFT structure 164, but is reflected by the reflective matrix element 168*b*. This arrangement may be desirable to reduce the reflectivity from the front side of the monochrome TFT.

Figure 18:
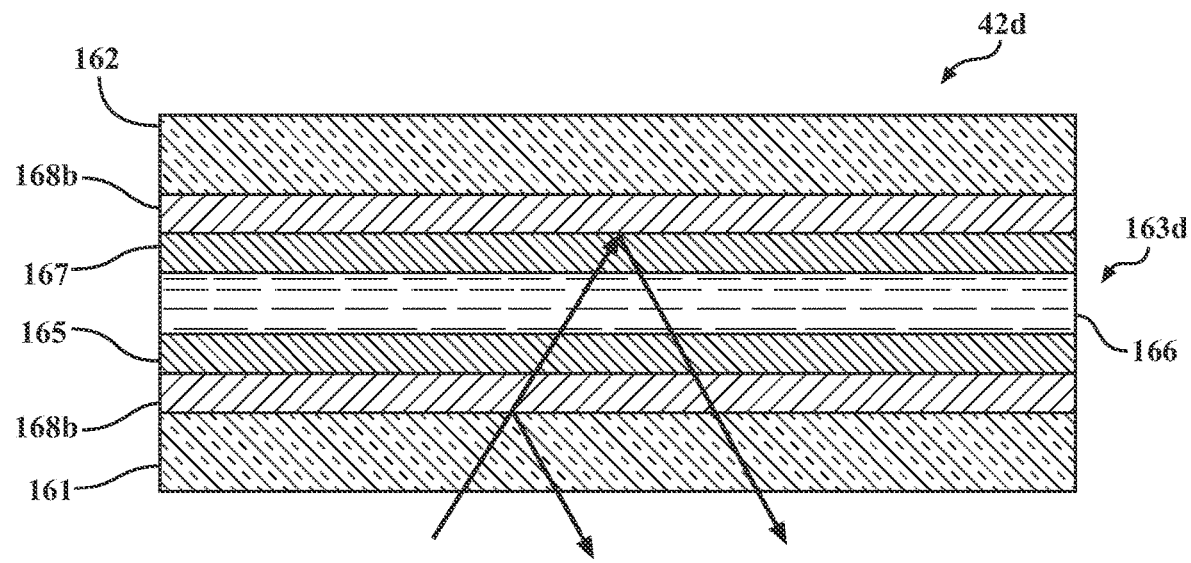

FIG. 18 schematically shows a cross-sectional view of the matrix structure area including a fourth embodiment of the liquid crystal layer 42*d*, including the first glass substrate 161 that is contiguous to the second glass substrate 162 and separated by the matrix structure 163*d*. The matrix structure 163*d* includes the active plane TFT structure 164 that includes capacitors and wiring traces, and the LCD element 166 that is disposed between first and second alignment layers 165, 167, respectively. In this embodiment, a first of the reflective matrix elements 168*b* is disposed immediately contiguous to the second glass substrate 162, and a second of the reflective matrix elements 168*b* is immediately adjacent to the first glass substrate 161. Light may be absorbed by the active plane TFT structure 164, but is reflected by the reflective matrix element 168*b*. This arrangement may be desirable to secure additional efficiencies. The active plane structures may consist of row and column routing, thin film transistor (TFT) and storage capacitor elements. The light that is absorbed by the active plane structures would be reflected back into the backlight for light recycling. As is known in the art suitable passivation materials may be required between the active plane structures and the reflective material such as metal to prevent shorting.

Figure 19:
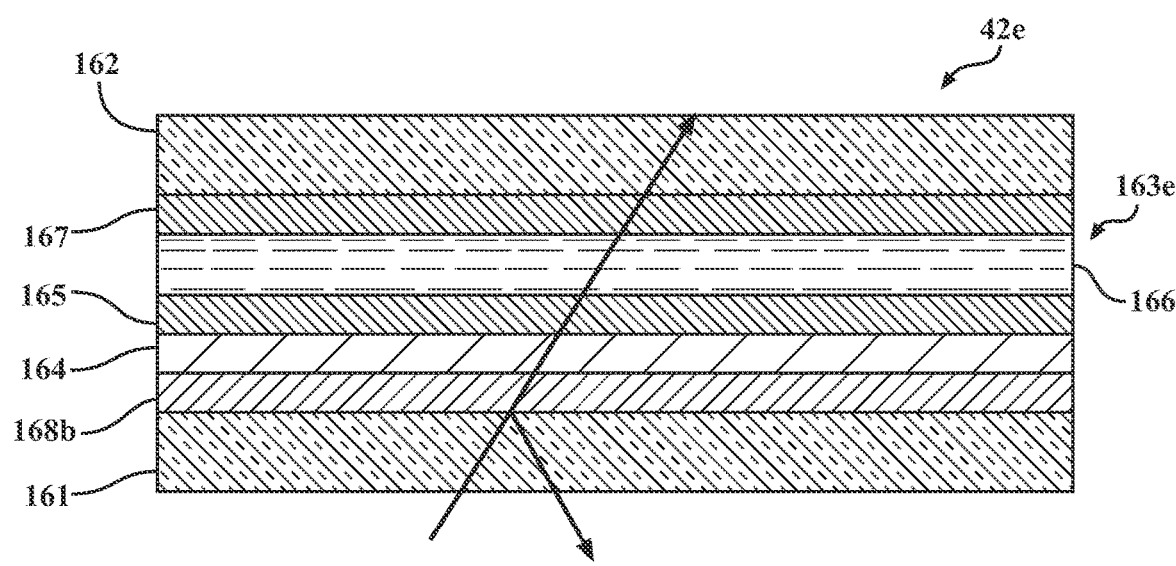

FIG. 19 schematically shows a cross-sectional view of the matrix structure area including a fifth embodiment of the liquid crystal layer 42*e*, including the first glass substrate 161 that is contiguous to the second glass substrate 162 and separated by the matrix structure 163*e*. The matrix structure 163*e* includes the active plane TFT structure 164 that includes capacitors and wiring traces, and the LCD element 166 that is disposed between first and second alignment layers 165, 167, respectively. In this embodiment, there is no reflective matrix element. Light may be absorbed by the active plane TFT structure 164, but is reflected by the reflective matrix element 168*b*. This arrangement may be desirable in conjunction with the diffuser element because light leakage disclinations may not be visible due to the diffuser.

Figure 20:
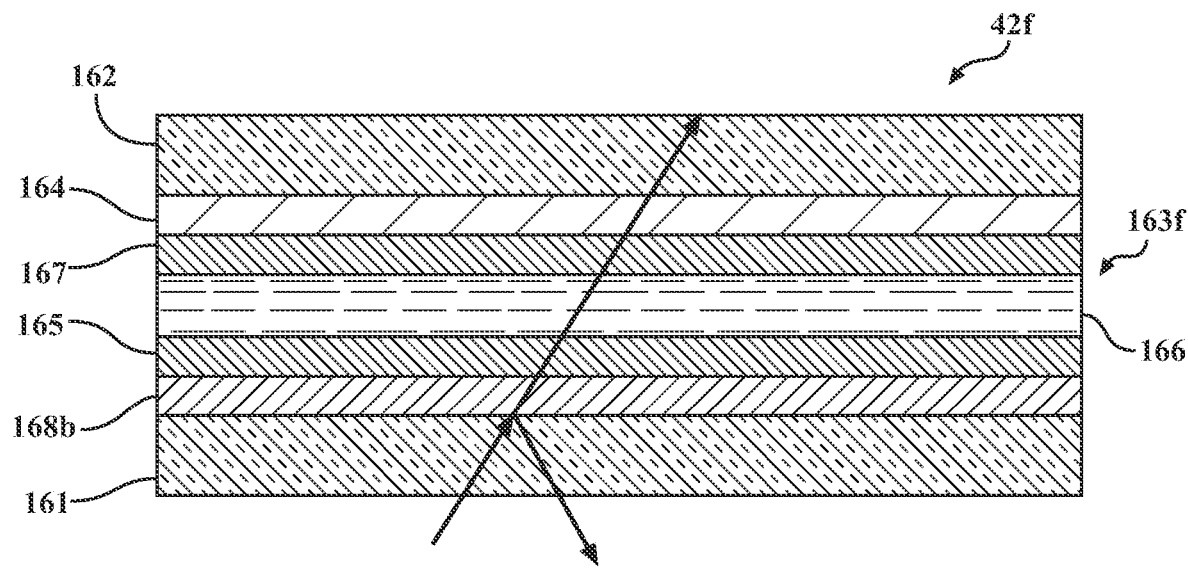

FIG. 20 schematically shows a cross-sectional view of the matrix structure area including a sixth embodiment of the liquid crystal layer 42*f*, including the first glass substrate 161 that is contiguous to the second glass substrate 162 and separated by the matrix structure 163*f* The matrix structure 163*f* includes the active plane TFT structure 164 that includes capacitors and wiring traces, and the LCD element 166 that is disposed between first and second alignment layers 165, 167, respectively. In this embodiment, the reflective matrix element 168*b* is disposed immediately contiguous to the first glass substrate 161, and the active plane TFT structure 164 is disposed immediately contiguous to the second glass substrate 162. Inverting the monochrome TFT structure such that the reflective matrix is on the back side on the monochrome TFT minimizes the need to provide a reflective structure over the active plane structures since they would be light shielded by the reflective matrix element 168*b*.

Figure 21:
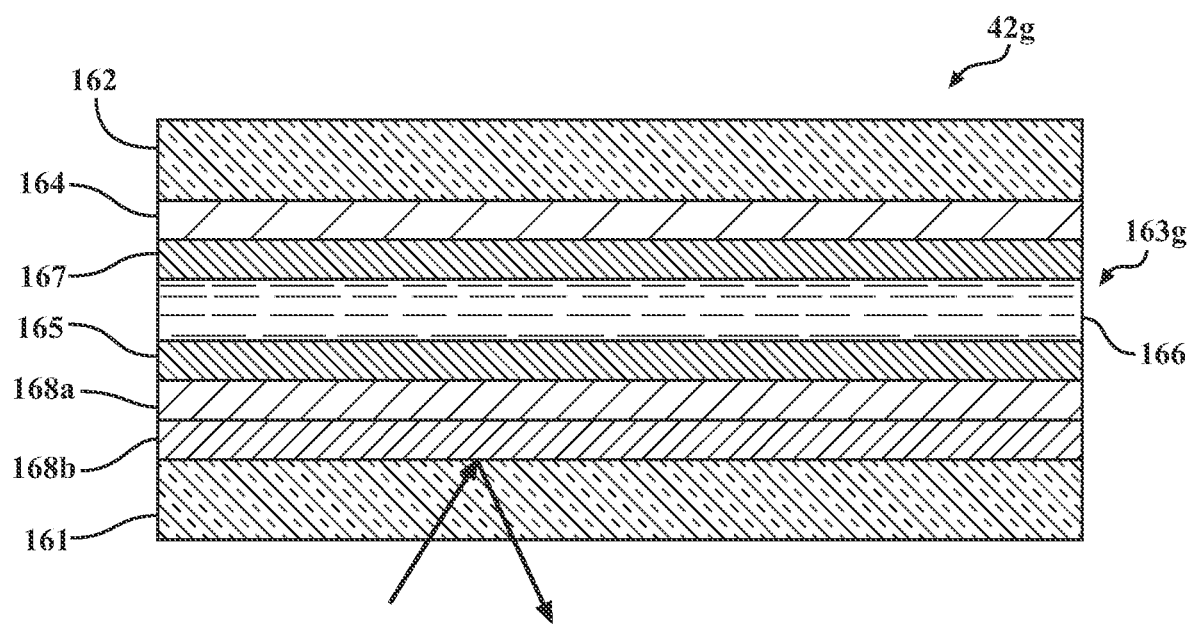

FIG. 21 schematically shows a cross-sectional view of the matrix structure area including a seventh embodiment of the liquid crystal layer 42*g*, including the first glass substrate 161 that is contiguous to the second glass substrate 162 and separated by the matrix structure 163*g*. The matrix structure 163*g* includes the active plane TFT structure 164 that includes capacitors and wiring traces, and the LCD element 166 that is disposed between first and second alignment layers 165, 167, respectively. In this embodiment, the reflective matrix element 168*b* is disposed immediately contiguous to the first glass substrate 161, the black matrix element 168*a* is disposed immediately contiguous to the reflective matrix element 168*b*, and the active plane TFT structure 164 is disposed immediately contiguous to the second glass substrate 162. Inverting the monochrome TFT structure such that the reflective matrix is on the back side on the monochrome TFT minimizes the need to provide a reflective structure over the active plane structures since they would be light shielded by the reflective matrix element 168*b*. Furthermore, the use of reflective structures to prevent light absorption will yield efficiency improvements of around half of the 20% (i.e. 10%) of the light that is recycled because the recycling process in the backlight yields about 50% of the light in correct polarization. However higher efficiencies may be expected with the reflective configurations because the reflected light will be in the correct polarization orientation.

Figure 23:
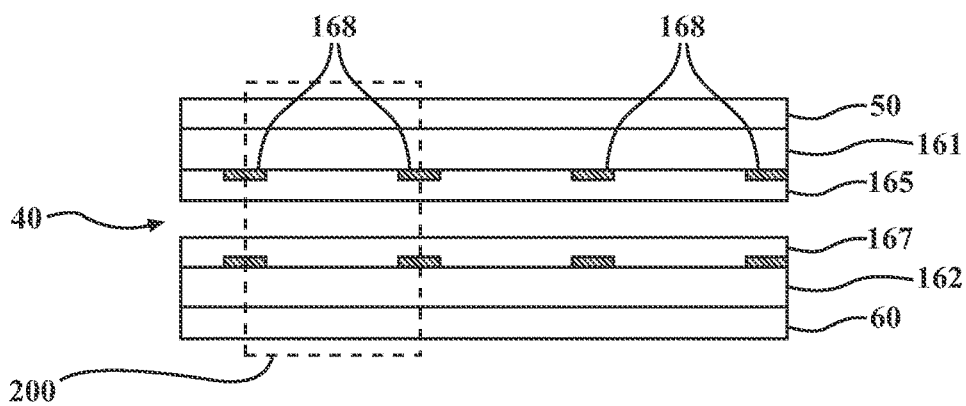
FIG. 23 schematically illustrates a cutaway side view of a liquid crystal layer of a display unit that includes a pixel, in accordance with the disclosure.

FIG. 23 schematically illustrates a cutaway side view of an embodiment of a liquid crystal layer of a display unit 40 that includes a pixel 200, including a transition portion where a change is made between an absorptive black matrix and a reflective matrix.

The foregoing detailed description and the drawings are supportive and descriptive of the disclosure, but the scope of the disclosure is defined solely by the claims. As will be appreciated by those of ordinary skill in the art, various alternative designs and embodiments may exist for practicing the disclosure defined in the claims.

The invention claimed is:

1. A display system comprising:
   a backlight including a housing receiving one or more light emitting elements to generate and project light from the backlight and one or more reflective portions disposed on the housing;
   a first display unit disposed proximate to the backlight, wherein the first display unit includes an upper substrate, a liquid crystal layer cooperating with the upper substrate, a lower substrate disposed opposite the upper substrate and cooperating with the liquid crystal layer, a first reflective polarizer cooperating with the upper substrate and a second reflective polarizer cooperating with the lower substrate of the first display unit, wherein the liquid crystal layer is pixelated such that each pixel is dynamically configured to optically rotate the light to produce a local dimming at a pixel level;
   a second display unit disposed proximate to the first display unit, wherein the second display unit includes an upper substrate, a thin film transistor (TFT) display layer cooperating with the upper substrate, a lower substrate disposed opposite the upper substrate and cooperating with the TFT display layer and at least one linear polarizer cooperating with one or more of the upper substrate and the lower substrate of the second display unit;
   a diffuser disposed between the first display unit and the second display unit; and
   a microcontroller for controlling the backlight, the first display unit, and the second display unit;
   wherein the microcontroller is configured to execute instructions to adjust the liquid crystal layer of the first display unit between at least a first transmissive state and a second transmissive state, the first transmissive state resulting in a first percentage of the light passing through the second reflective polarizer thereafter passing through the liquid crystal layer and out of the first reflective polarizer, the second transmissive state resulting in a second percentage of the light passing through the second reflective polarizer thereafter passing through the liquid crystal layer and out of first reflective polarizer.

2. The display system of claim 1, wherein:
   the diffuser is arranged to provide a light profile transition for the light transmitted through the first display unit; and
   the second percentage is less than the first percentage.

3. The display system of claim 1, wherein the diffuser disposed between the first display unit and the second display unit comprises a base plastic film including a light scattering agent.

4. The display system of claim 1, wherein the diffuser disposed between the first display unit and the second display unit comprises an optically clear adhesive infused with diffusion beads.

5. The display system of claim 1, wherein the diffuser disposed between the first display unit and the second display unit comprises a liquid optically clear adhesive infused with diffusion beads.

6. The display system of claim 1, wherein the diffuser disposed between the first display unit and the second display unit comprises an anti-sparkle film based on diffraction grating structures.

7. The display system of claim 1, wherein the diffuser disposed between the first display unit and the second display unit comprises an anti-glare polarizer film including an index mismatched liquid optically clear adhesive.

8. The display system of claim 1, wherein the diffuser disposed between the first display unit and the second display unit comprises a surface diffuser film including an index mismatched liquid optically clear adhesive.

9. A display system comprising:
   a backlight configured to generate and project light;
   a first display unit disposed proximate to the backlight, wherein the first display unit includes an upper substrate, a liquid crystal layer cooperating with the upper substrate, a lower substrate disposed opposite the upper substrate and cooperating with the liquid crystal layer and at least one reflective polarizer cooperating with one or more of the upper substrate and the lower substrate of the first display unit, wherein the liquid crystal layer is pixelated such that each pixel is dynamically configured to optically rotate the light to produce a local dimming at a pixel level;
   a second display unit disposed proximate to the first display unit, wherein the second display unit includes an upper substrate, a thin film transistor (TFT) display layer cooperating with the upper substrate, a lower substrate disposed opposite the upper substrate and cooperating with the TFT display layer and at least one linear polarizer cooperating with one or more of the upper substrate and the lower substrate of the second display unit;
   a diffuser disposed between the first display unit and the second display unit; and
   a microcontroller for communicating with one or more of the backlight, the first display unit, and the second display unit;
   wherein the microcontroller is configured to execute instructions to adjust the liquid crystal layer of the first display unit between at least a first transmissive state and a second transmissive state;
   wherein the at least one reflective polarizer of the first display unit includes a first reflective polarizer having a body including an upper surface and an opposing lower surface that cooperates with the upper substrate of the first display unit, a second reflective polarizer having a body including an upper surface cooperating with the lower substrate of the first display unit and an opposing lower surface, and an anti-reflection film disposed on a rear surface of the second reflective polarizer; and
   wherein the first transmissive state results in a first percentage of the light passing through the second reflective polarizer thereafter passing through the liquid crystal layer and out of first reflective polarizer, and the second transmissive state results in a second percentage of the light passing through the second reflective polarizer thereafter passing through the liquid crystal layer and out of first reflective polarizer.

10. The display system of claim 9, wherein the antireflection film comprises a moth-eye-type antireflection film.

11. The display system of claim 9, wherein:
the diffuser is arranged to provide a light profile transition for light transmitted through the first display unit; and
the second percentage is less than the first percentage.

12. The display system of claim 9, wherein the diffuser disposed between the first display unit and the second display unit comprises a base plastic film including a light scattering agent.

13. The display system of claim 9, wherein the diffuser disposed between the first display unit and the second display unit comprises an optically clear adhesive infused with diffusion beads.

14. The display system of claim 9, wherein the diffuser disposed between the first display unit and the second display unit comprises a liquid optically clear adhesive infused with diffusion beads.

15. The display system of claim 9, wherein the diffuser disposed between the first display unit and the second display unit comprises an anti-sparkle film based on diffraction grating structures.

16. The display system of claim 9, wherein the diffuser disposed between the first display unit and the second display unit comprises an anti-glare polarizer film including an index mismatched liquid optically clear adhesive.

17. The display system of claim 9, wherein the diffuser disposed between the first display unit and the second display unit comprises a surface diffuser film including an index mismatched liquid optically clear adhesive.

18. A display system comprising:
a backlight configured to generate and project light;
a pixelated first display unit disposed proximate to the backlight;
a second display unit disposed proximate to the first display unit;
a diffuser disposed between the first display unit and the second display unit;
a microcontroller for communicating with one or more of the backlight, the first display unit, and the second display unit; and
wherein the microcontroller is configured to execute instructions to adjust the first display unit between at least a first transmissive state and a second transmissive state, the first transmissive state resulting in a first percentage of the light passing through the first display unit and out to the second display unit, the second transmissive state resulting in a second percentage of the light passing through the first display unit and out to the second display unit, the second percentage being less than the first percentage.

19. The display system of claim 18, further comprising:
a first reflective polarizer positioned between the second display unit and the first display unit;
a second reflective polarizer positioned between the first display unit and the backlight;
wherein the first display unit includes a liquid crystal layer, the liquid crystal layer being pixelated such that each pixel is dynamically configured to optically rotate the light to produce a local dimming at a pixel level;
wherein the second polarizer during the first and second transmissive states reflects a portion of the light to the backlight for recycling prior to passing through to the liquid crystal layer;
wherein the first polarizer during the second transmissive state reflects an additional portion of the light to the backlight for recycling.

20. The display system of claim 18, wherein the microcontroller is configured to execute instructions to adjust the first display unit between the first and second transmissive states and a third transmissive state, the third transmissive state resulting in a third percentage of the light passing through the first display unit and out to the second display unit, the third percentage being less than the second percentage.

* * * * *